United States Patent
Ito et al.

(10) Patent No.: US 9,658,429 B2
(45) Date of Patent: May 23, 2017

(54) FOCUS ADJUSTMENT DEVICE, IMAGING DEVICE AND FOCUS ADJUSTMENT METHOD

(71) Applicant: Olympus Corporation, Hachioji-shi, Tokyo (JP)

(72) Inventors: Kazumi Ito, Fuchu (JP); Keigo Matsuo, Kunitachi (JP); Satoru Ito, Komae (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/074,030

(22) Filed: Mar. 18, 2016

(65) Prior Publication Data

US 2016/0205312 A1 Jul. 14, 2016

Related U.S. Application Data

(63) Continuation of application No. PCT/JP2014/075581, filed on Sep. 26, 2014.

(30) Foreign Application Priority Data

Oct. 2, 2013 (JP) ................................. 2013-207774

(51) Int. Cl.
  *G02B 7/38* (2006.01)
  *H04N 5/232* (2006.01)
  *G03B 13/36* (2006.01)

(52) U.S. Cl.
  CPC ............... *G02B 7/38* (2013.01); *G03B 13/36* (2013.01); *H04N 5/23212* (2013.01);
  (Continued)

(58) Field of Classification Search
  CPC .......... H04N 5/23212; H04N 5/23287; H04N 5/23258; H04N 5/23248; H04N 5/23264;
  (Continued)

(56) References Cited

U.S. PATENT DOCUMENTS 5,748,994 A     5/1998  Kai et al.
6,097,896 A *   8/2000  Usui .................... G02B 27/646
                                                           359/554

(Continued)

OTHER PUBLICATIONS

International Search Report to International Application No. PCT/JP2014/075581, mailed on Dec. 22, 2014 (1 pg.) with translation (1 pg.).

(Continued)

*Primary Examiner* — Michael Osinski
(74) *Attorney, Agent, or Firm* — John C. Pokotylo; Straub & Pokotylo

(57) ABSTRACT

A focus adjustment device comprises an image sensor having imaging pixels and focus detection pixels, which subjects light flux that is passed through a photographing lens to photoelectric conversion and outputs an image signal, a first memory which stores information relating to incident angle range of light flux that is incident towards the image sensor, a second memory which stores information relating to characteristics of the image sensor, and a calculation section which calculates information for focus adjustment based on output of the first memory and output of the second memory.

20 Claims, 19 Drawing Sheets

(52) U.S. Cl.
CPC ..... *H04N 5/23264* (2013.01); *H04N 5/23287* (2013.01); *G03B 2205/0007* (2013.01)

(58) Field of Classification Search
CPC  H04N 5/23209; H04N 5/2253–5/2254; G03B 2217/005; G03B 2205/0007; G03B 13/36; G02B 27/646; G02B 7/282; G02B 7/09; G02B 7/34; G02B 7/36; G02B 7/38; G06T 5/003

See application file for complete search history.

(56) References Cited

U.S. PATENT DOCUMENTS

| | | | | |
|---|---|---|---|---|
| 7,711,253 | B2* | 5/2010 | Tomita | H04N 5/23212 348/208.5 |
| 8,175,448 | B2* | 5/2012 | Miyasako | H04N 5/23212 348/208.3 |
| 8,576,289 | B2* | 11/2013 | Ishii | H04N 5/23258 348/208.4 |
| 8,743,268 | B2* | 6/2014 | Kawahara | H04N 5/23248 348/208.1 |
| 8,830,383 | B2* | 9/2014 | Hamano | G03B 13/18 348/208.12 |
| 9,264,605 | B2* | 2/2016 | Yamazaki | H04N 5/23212 |
| 2008/0012950 | A1* | 1/2008 | Lee | H04N 5/23248 348/208.99 |
| 2008/0180536 | A1 | 7/2008 | Nakahara | |
| 2009/0295964 | A1 | 12/2009 | Utagawa et al. | |
| 2010/0189356 | A1* | 7/2010 | Sugita | G11B 27/28 382/190 |
| 2011/0164863 | A1* | 7/2011 | Hayashi | G02B 27/646 396/55 |
| 2012/0050580 | A1* | 3/2012 | Iwasaki | H04N 5/23212 348/240.99 |
| 2012/0162493 | A1 | 6/2012 | Wakamiya et al. | |
| 2012/0293672 | A1* | 11/2012 | Nonaka | G03B 5/00 348/208.5 |
| 2013/0182082 | A1 | 7/2013 | Hayashi | |
| 2014/0211075 | A1 | 7/2014 | Inoue et al. | |
| 2014/0320736 | A1* | 10/2014 | Tomita | G02B 7/34 348/353 |
| 2015/0146024 | A1* | 5/2015 | Takeuchi | G02B 27/646 348/208.4 |
| 2016/0006923 | A1* | 1/2016 | Imamura | H04N 5/23209 348/208.11 |
| 2016/0037051 | A1* | 2/2016 | Tomosada | G02B 7/102 348/347 |
| 2016/0054642 | A1* | 2/2016 | Takeuchi | G03B 5/02 396/55 |
| 2016/0057351 | A1* | 2/2016 | Noguchi | H04N 5/23264 348/208.4 |
| 2016/0261799 | A1* | 9/2016 | Horikawa | H04N 5/232 |
| 2016/0327806 | A1* | 11/2016 | Kasamatsu | G02B 27/646 |
| 2017/0013199 | A1* | 1/2017 | Kunugi | H04N 5/23287 |

OTHER PUBLICATIONS

Extended Search Report to corresponding European Patent Application No. 14850610.8, mailed on Feb. 22, 2017 (8 pgs.).

* cited by examiner

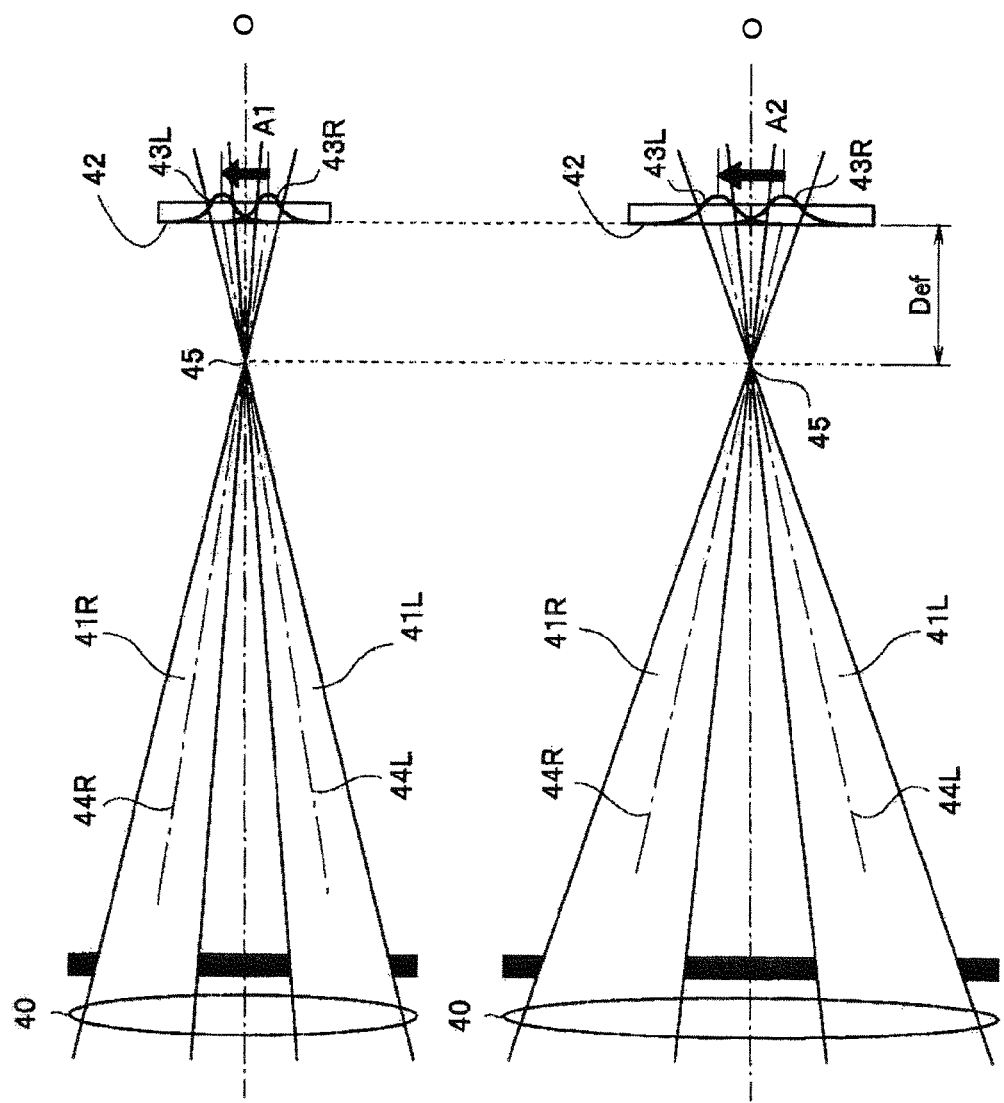

FIG. 9A

|   | 1 | 2 | 3 | 4 | 5 | 6 | 7 | 8 | 9 |
|---|---|---|---|---|---|---|---|---|---|
| a |   |   |   |   |   |   |   |   |   |
| b |   |   |   | 12 | 11 | 12 |   |   |   |
| c |   |   | 10 | 9 | 8 | 9 | 10 |   |   |
| d |   | 7 | 6 | 5 | 4 | 5 | 6 | 7 |   |
| e |   | 3 | 2 | 1 | 0 | 1 | 2 | 3 |   |
| f |   | 7 | 6 | 5 | 4 | 5 | 6 | 7 |   |
| g |   |   | 10 | 9 | 8 | 9 | 10 |   |   |
| h |   |   |   | 12 | 11 | 12 |   |   |   |
| i |   |   |   |   |   |   |   |   |   |

FIG. 9B

|    |     | Lo |  |  |  |  |  |  |  |  |
|----|-----|-------|-------|-------|-------|-------|-------|-------|-------|-------|
|    |     | -24 | -21 | -18 | -15 | -12 | -9 | -6 | -3 | 0 |
| UP | -3 | 0.649 | 0.580 | 0.680 | 0.872 | 1.237 | 2.127 | #N/A | #N/A | #N/A |
|    | 0  | 0.278 | 0.265 | 0.298 | 0.350 | 0.434 | 0.579 | 0.937 | #N/A | #N/A |
|    | 3  | 0.143 | 0.141 | 0.156 | 0.177 | 0.209 | 0.258 | 0.366 | 0.682 | #N/A |
|    | 6  | 0.097 | 0.097 | 0.107 | 0.120 | 0.139 | 0.167 | 0.226 | 0.373 | 0.988 |
|    | 9  | 0.076 | 0.077 | 0.084 | 0.094 | 0.108 | 0.128 | 0.169 | 0.265 | #N/A |
|    | 12 | 0.066 | 0.067 | 0.073 | 0.081 | 0.092 | 0.108 | 0.141 | #N/A | #N/A |
|    | 15 | 0.059 | 0.060 | 0.065 | 0.072 | 0.081 | 0.094 | #N/A | #N/A | #N/A |
|    | 18 | 0.055 | 0.055 | 0.059 | 0.065 | 0.073 | #N/A | #N/A | #N/A | #N/A |
|    | 21 | 0.051 | 0.051 | 0.055 | 0.060 | #N/A | #N/A | #N/A | #N/A | #N/A |
|    | 24 | 0.050 | 0.048 | 0.052 | #N/A | #N/A | #N/A | #N/A | #N/A | #N/A |

FIG. 13

| AFK[i][j] | | Lo INDEX : j | | | | | | | | Lo_table[j] |
|---|---|---|---|---|---|---|---|---|---|---|
| | | -0.2 | -0.1 | 0 | 0.1 | 0.2 | 0.3 | 0.4 | 0.5 | |
| | | 0 | 1 | 2 | 3 | 4 | 5 | 6 | 7 | |
| Up INDEX : i | 0 | 0.69574 | 0.696838 | 0.697998 | 0.699341 | 0.700745 | 0.702271 | 0.703918 | 0.705688 | |
| | 1 | 0.737488 | 0.738708 | 0.740051 | 0.741516 | 0.743164 | 0.744873 | 0.746765 | 0.748779 | |
| | 2 | 0.788452 | 0.789917 | 0.791443 | 0.793152 | 0.794983 | 0.796936 | 0.799133 | 0.801453 | |
| | 3 | 0.851685 | 0.853333 | 0.855164 | 0.857117 | 0.859314 | 0.861633 | 0.864197 | 0.866943 | |
| | 4 | 0.931763 | 0.933716 | 0.935852 | 0.938232 | 0.940857 | 0.943665 | 0.946716 | 0.950073 | |
| | 5 | 1.035889 | 1.03833 | 1.040955 | 1.043884 | 1.047119 | 1.050598 | 1.054443 | 1.058594 | |
| | 6 | 1.177795 | 1.180847 | 1.184265 | 1.188049 | 1.1922 | 1.196716 | 1.20166 | 1.207092 | |
| | 7 | 1.386047 | 1.390259 | 1.394958 | 1.400146 | 1.405823 | 1.412109 | 1.419006 | 1.426514 | |
| | ... | | | | | | | | | |

Up_table[i]: -0.4, -0.3, -0.2, -0.1, 0, 0.1, 0.2, 0.3

FIG. 16A

| Up_table[i] | |
|---|---|
| INDEX : i | value |
| 0 | −0.4 |
| 1 | −0.3 |
| 2 | −0.2 |
| 3 | −0.1 |
| 4 | 0.0 |
| 5 | 0.1 |
| 6 | 0.2 |
| 7 | 0.3 |
| ... | ... |
| 127 | 12.3 |

FIG. 16B

| Lo_table[j] | |
|---|---|
| INDEX : j | value |
| 0 | −0.2 |
| 1 | −0.1 |
| 2 | 0.0 |
| 3 | 0.1 |
| 4 | 0.2 |
| 5 | 0.3 |
| 6 | 0.4 |
| 7 | 0.5 |
| ... | ... |
| 127 | 12.5 |

FOCUS ADJUSTMENT DEVICE, IMAGING DEVICE AND FOCUS ADJUSTMENT METHOD

CROSS-REFERENCE TO RELATED APPLICATIONS

This application is a Continuation application of PCT Application No. PCT/JP2014/075581, filed on Sep. 26, 2014 and based upon and claiming the benefit of priority from prior Japanese Patent Application No. 2013-207774, filed on Oct. 2, 2013, the entire contents of all of which are incorporated herein by reference.

BACKGROUND OF THE INVENTION

1. Field of the Invention

The present invention relates to a focus adjustment device for carrying out focus adjustment using a phase difference AF method, based on output of an image sensor that has imaging pixels and focus detection pixels, and to an imaging device and a focus adjustment method.

2. Description of the Related Art

A focus adjustment device, that forms a subject image that has been formed using an photographing optical system having focus detection pixels arranged at positions of some imaging pixels that are arranged two dimensionally, and also carries out focus adjustment for the photographing optical system using a pupil-division phase difference method, is known. With an image sensor of this focus adjustment device, incident angles to photoelectric conversion elements of focus detection pixels, of pairs of light flux for focus detection that have passed through regions of differing exit pupils of the photographing optical system, vary with increasing distance from points of a light receiving surface of the image sensor that intersect the optical axis of the photographing optical system, and focus detection precision is lowered.

A focus adjustment device has therefore been proposed that sets a positional relationship between positions of microlenses for pupil-division and positions of focus detection pixels in accordance with image height of a light receiving surface of an image sensor (Japanese patent laid-open No. 2009-290157 (refer to patent literature 1)).

SUMMARY OF THE INVENTION

With above described patent literature 1, it is possible to reduce error due to image height of focus detection pixels. However, since an AF characteristic varies depending on not only image height but also states such as focal length, focus position and aperture etc. of a photographing optical system, it is necessary to perform correction in accordance with states of the optical system. Further, when carrying out hand shake correction, in a case where there is a so-called vibration mechanism, where an image sensor is driven within a plane perpendicular to the optical axis of the photographing optical system in accordance with hand shake, it is not possible to eliminate errors arising due to change in relative image height with movement of the image sensor. In addition, with microlenses of an image sensor, relative positional offset arises between portions constituting optical elements and portions constituting a microlens array, with the manufacturing process of the microlenses, and there is a problem in that errors due to this positional offset cannot be removed.

The present invention has been conceived in view of the above-described situation, and has as its object to provide a focus adjustment device, imaging device and focus adjustment method capable of carrying out appropriate correction in accordance with state of a photographing lens and image sensor.

Means of Solving the Problems

A focus adjustment device of a first aspect of the present invention comprises an image sensor having imaging pixels and focus detection pixels, which subjects light flux that is passed through a photographing lens to photoelectric conversion and outputs an image signal, a first memory which stores information relating to angle of emission range of light flux that is emitted towards the image sensor, in accordance with image height, a second memory which stores information relating to characteristics of the image sensor, and a vibration section which corrects hand shake by causing movement of the image sensor in a direction perpendicular to the optical axis of the photographing lens, and outputs information relating to the movement, and a calculation section which calculates information for focus adjustment based on output of the first memory, output of the second memory and output of the vibration section, wherein the calculation section calculates information relating to corrected angle of emission range based on information related to the angle of emission range and information relating to the movement, and calculates information for focus adjustment based on the information relating to the corrected angle of emission range and information relating to characteristics of the image sensor.

An imaging device of a second aspect of the present invention is an imaging device having a lens section that guides light flux that has passed through a photographing lens and a body section capable of being fitted to the lens section, comprising an image sensor having imaging pixels and focus detection pixels, which subjects light flux that is passed through a photographing lens to photoelectric conversion and outputs an image signal, a first memory, provided in the lens section, which stores information relating to angle of emission range in accordance with image height of light flux that is emitted towards the image sensor, a second memory, provided in the body section, which stores information relating to characteristics of the image sensor, and the body section is provided with a vibration section which corrects hand shake by causing movement of the image sensor in a direction perpendicular to the optical axis of the photographing lens, and outputs information relating to the movement, and a calculation section which calculates information for focus adjustment based on output of the first memory, output of the second memory and output of the vibration section, wherein the calculation section calculates information relating to corrected angle of emission range based on information related to the angle of emission range and information relating to the movement, and calculates information for focus adjustment based on the information relating to the corrected angle of emission range and information on characteristics of the image sensor.

A focus adjustment method of a third aspect of the present invention is a focus adjustment method for an imaging device, having a lens section, which guides light flux that has passed through a photographing lens, a body section, comprising an image sensor having imaging pixels and focus detection pixels, which subjects light flux that has passed through the photographing lens, that is capable of being fitted to the lens section, to photoelectric conversion and outputs an image signal, and a vibration section which corrects hand shake by causing movement of the image sensor in a direction perpendicular to the optical axis of the photographing lens, and outputs information relating to the movement, comprising reading out information relating to angle of emission range in accordance with image height of light flux that is emitted towards the image sensor from the lens section, reading out information on characteristics of the image sensor from the body section, and calculating information relating to corrected angle of emission range based on information related to the angle of emission range and output of the vibration section, and calculates information for focus adjustment based on the information relating to the corrected angle of emission range and information on characteristics of the image sensor.

BRIEF DESCRIPTION OF THE DRAWINGS

FIG. 1A and FIG. 1B are drawings for explaining a relationship between F value (F number, FNo) and 2 images in a pupil-division phase difference method, with one embodiment of the present invention.

FIG. 9A and FIG. 9B show tables for correcting AF sensitivity using image height, with the one embodiment of the present invention.

FIG. 13 shows tables for correcting AF sensitivity of a camera of one embodiment of the present invention.

FIG. 16A and FIG. 16B show a modified examples of tables for correcting AF sensitivity of a camera of one embodiment of the present invention.

DETAILED DESCRIPTION OF THE PREFERRED EMBODIMENTS

Figure 2A:
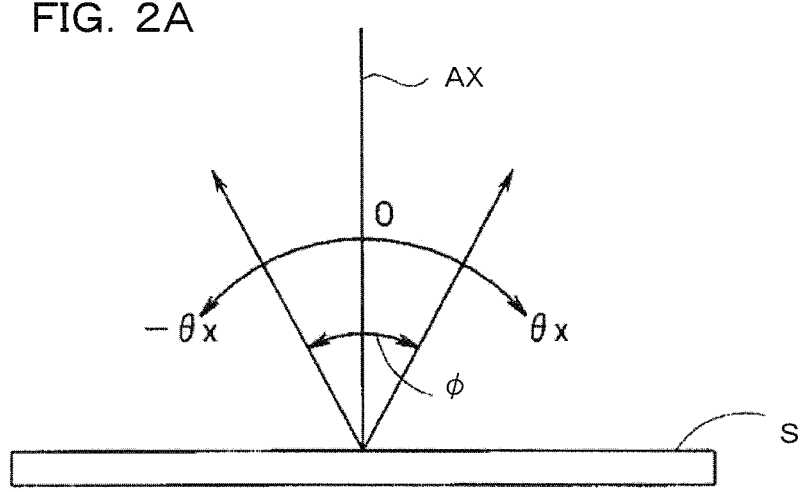
FIG. 2A and FIG. 2B are drawings for explaining a sensitivity characteristic of focus detection pixels with the one embodiment of the present invention.

A preferred embodiment using a digital camera (hereafter abbreviated to camera) to which the present invention has been applied will be described in the following in accordance with the drawings. Before describing the specific structure of this embodiment, AF sensitivity used for focus detection and causes of variation in AF sensitivity will be described.

FIG. 1A and FIG. 1B are drawings for explaining a relationship between F value (F number) and two-image interval, in a pupil-division phase difference method. FIG. 1A shows an example when F value is large, while FIG. 1B shows an example when F value is small. FIG. 1A and FIG. 1B show appearance when right luminous flux 41R and left luminous flux 41L used in a pupil-division phase difference method are incident on an imaging surface 42. In FIG. 1A and FIG. 1B apertures are depicted on the optical axis O in the vicinity of a lens since it is a theoretical description, but in actual fact there is means (with this embodiment, microlenses) for dividing light flux for pupil-division within the image sensor.

In a pupil-division phase difference method, each light path from a subject is divided into a left direction and a right direction, for example, at exit pupils, and light flux from the right direction (right light flux) and light flux from a left direction (left light flux) are incident on an imaging surface (light receiving surface) of the image sensor. Pixels for receiving the right light flux (hereafter referred to as R pixels) and pixels for receiving the left light flux (hereafter referred to as L pixels) are provided on the image sensor, and the left light flux and right light flux are respectively imaged on respective imaging surfaces of the R pixels and the L pixels.

In FIG. 1A and FIG. 1B, a right image 43R resulting from right luminous flux 41R incident via the lens 40 is acquired using R pixels, and a left image 43L resulting from left luminous flux 41L is obtained using L pixels. An amount of displacement and direction of displacement between the right image 43R and the left image 43L on the imaging surface 42 correspond to defocus amount and defocus direction. A distance on the imaging surface 42 between a principal ray 44R of the right luminous flux 41R and a principal beam 44L of the left luminous flux 41L is a two-image interval A1 (shown by the filled arrow), and the two image interval A1 is proportional to a distance between the imaging surface 42 and focal point 45 (defocus amount). This proportionality coefficient is AF sensitivity, and if AF sensitivity for FIG. 1A is made α1, then defocus amount Def can be represented by Def=α1×A1.

The two-image interval can be obtained from outputs of the R pixels and the L pixels, and so if AF sensitivity is obtained it is possible to calculate defocus amount. AF sensitivity can be obtained from AF operation parameters based on characteristics of the lens and the image sensor.

FIG. 1B shows an example when the effective aperture of a lens 40 has been changed with respect to FIG. 1A. Examples are shown where defocus amount Def in FIG. 1B coincides with the defocus amount Def in FIG. 1A. If a two-image interval for the FIG. 1B is made A2 and AF sensitivity obtained from AF operation parameters is made $\alpha 2$, then the defocus amount def can be represented by Def=$\alpha 2 \times A2$.

The examples of FIG. 1A and FIG. 1B show that even if defocus amount Def is constant the two-image interval varies in accordance with FNo. Specifically, the examples of FIG. 1A and FIG. 1B show that AF sensitivity changes in accordance with FNo., and show that it is possible to use effective aperture information, for example F value, as AF operation parameters for obtaining AF sensitivity. With the examples of FIG. 1A and FIG. 1B, it is possible to calculate defocus amount from information on the two-image interval and the F value.

However, the F value is defined by a ray on the optical axis O. This means that with this embodiment, to express effective aperture of light flux for focus detection pixels that are located off the optical axis O, information on a value for FNo. equivalent (CF value) is used as an AF operation parameter for any peripheral light flux.

Figure 2B:
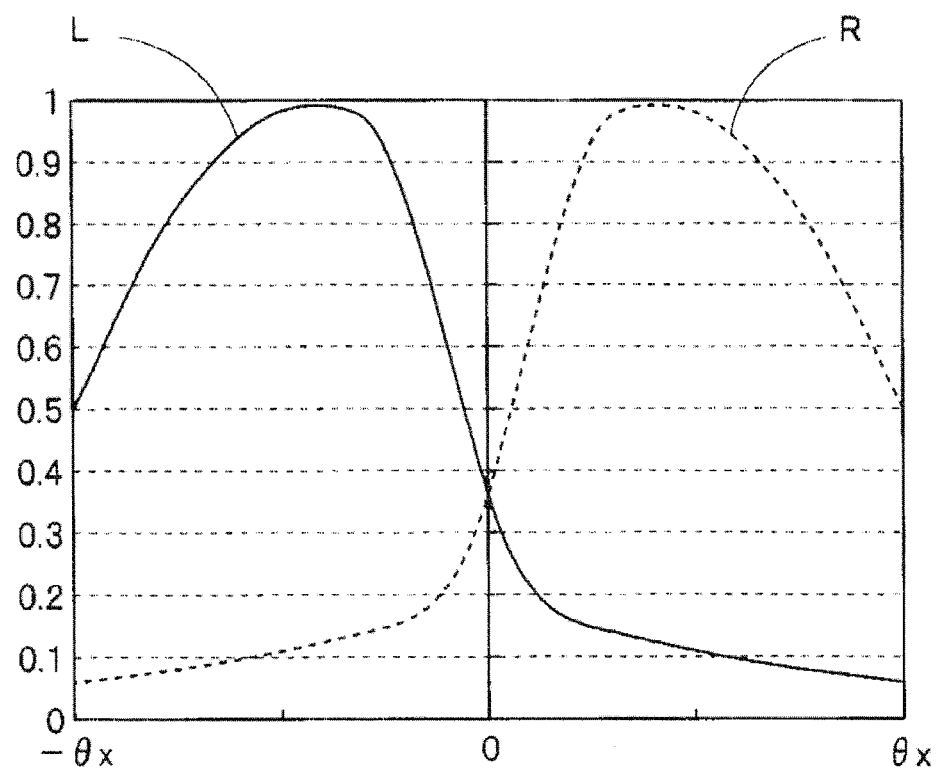

FIG. 2A and FIG. 2B are explanatory drawings for describing light receiving sensitivity characteristics of focus detection pixels. FIG. 2A shows a range $\phi$ of incident angle (ray incident angle $\theta x$), in a pupil-division direction, for light flux (imaging light flux) incident on a light receiving surface S. As shown in FIG. 2A, a ray incident angle $\theta x$ is shown as an angle in positive and negative directions between an axis AX that is perpendicular to the light receiving surface S and the ray incident angle, with an axis that is perpendicular to the light receiving surface S made 0°.

FIG. 2B respectively shows light receiving sensitivity characteristics for L pixels that receive left light flux that has passed through a left pupil and R pixels that receive right light flux that has passed through a left pupil as a solid line L and a dashed line R, the horizontal axis representing ray incident angle $\theta$ and the vertical axis representing light receiving sensitivity. FIG. 2B shows light receiving sensitivity characteristics of focus detection pixels that are positioned on the optical axis O, and light receiving sensitivity characteristics for L pixels and R pixels are substantially symmetrical about a ray incident angle 0.

Figure 3:
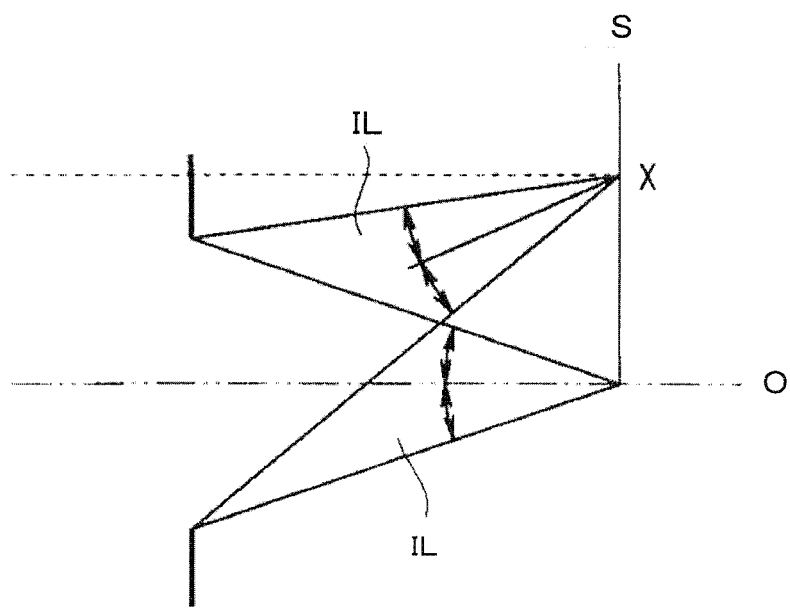
FIG. 3 is a drawing for explaining states of incident angle of imaging light flux on off-axis focus detection pixels, in one embodiment of the present invention.

As shown in FIG. 3, there may be cases where light flux that is off-axis (light flux corresponding to light receiving surface S) is inclined with respect to the optical axis O. With AF operation that uses these types of off-axis focus detection pixels, it is necessary to calculate an AF sensitivity that is different to the AF sensitivity used for light flux on the optical axis O. In order to calculate AF sensitivity, a range of light flux is obtained, but it is not possible to acquire appropriate AF sensitivity using only a corrected F value representing width of the light flux, and a value that represents the inclination of the light flux is also necessary.

Light receiving sensitivity of the focus detection pixels has an angular characteristic in the pupil-division direction. With this embodiment, AF sensitivity is calculated from angular range of the imaging light flux IL and angular characteristic of the focus detection pixels. Specifically, with this embodiment, information on sensitivity of the L and R pixels, and information relating to angular range of imaging light flux IL that is incident on the L and R pixels (corrected F value representing width of the light flux, and inclination of the light flux) are used as AF operation parameters for obtaining appropriate AF sensitivity.

Figure 4:
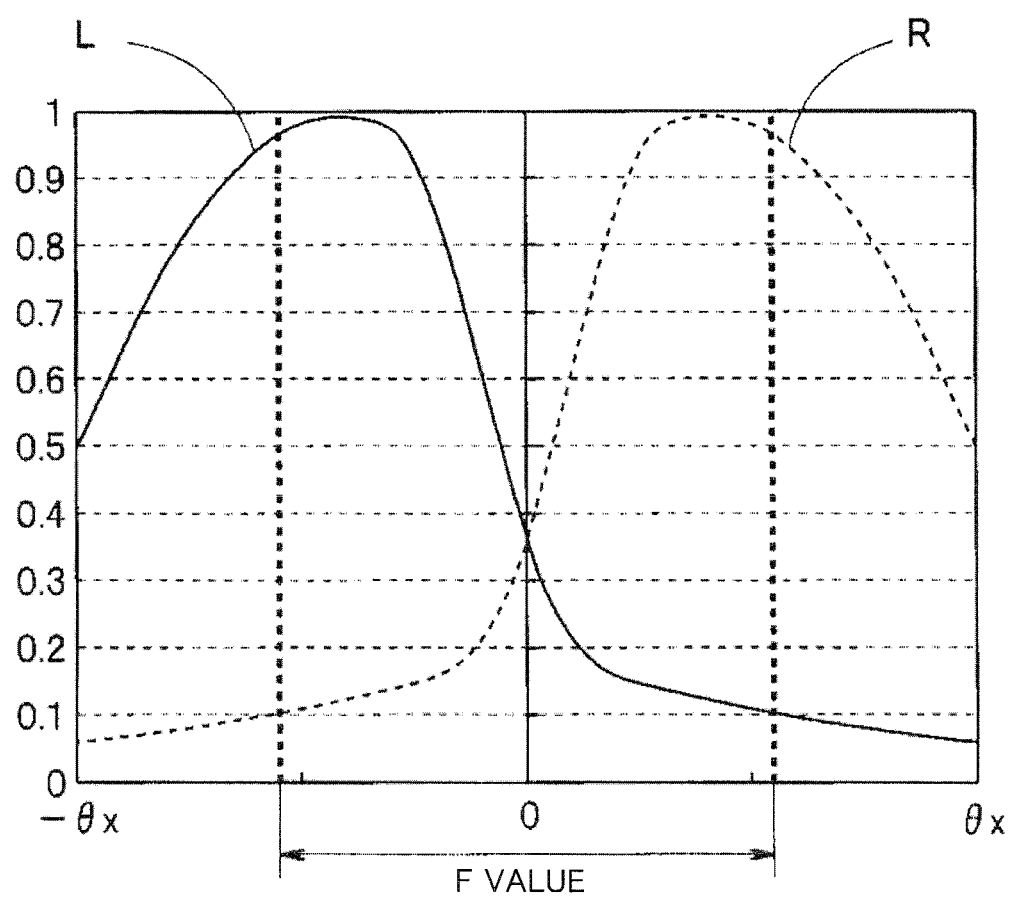
FIG. 4 is a drawing for explaining a relationship between imaging light flux angle range and AF sensitivity, for focus detection pixels that are on the optical axis, with the one embodiment of the present invention.
Figure 5:
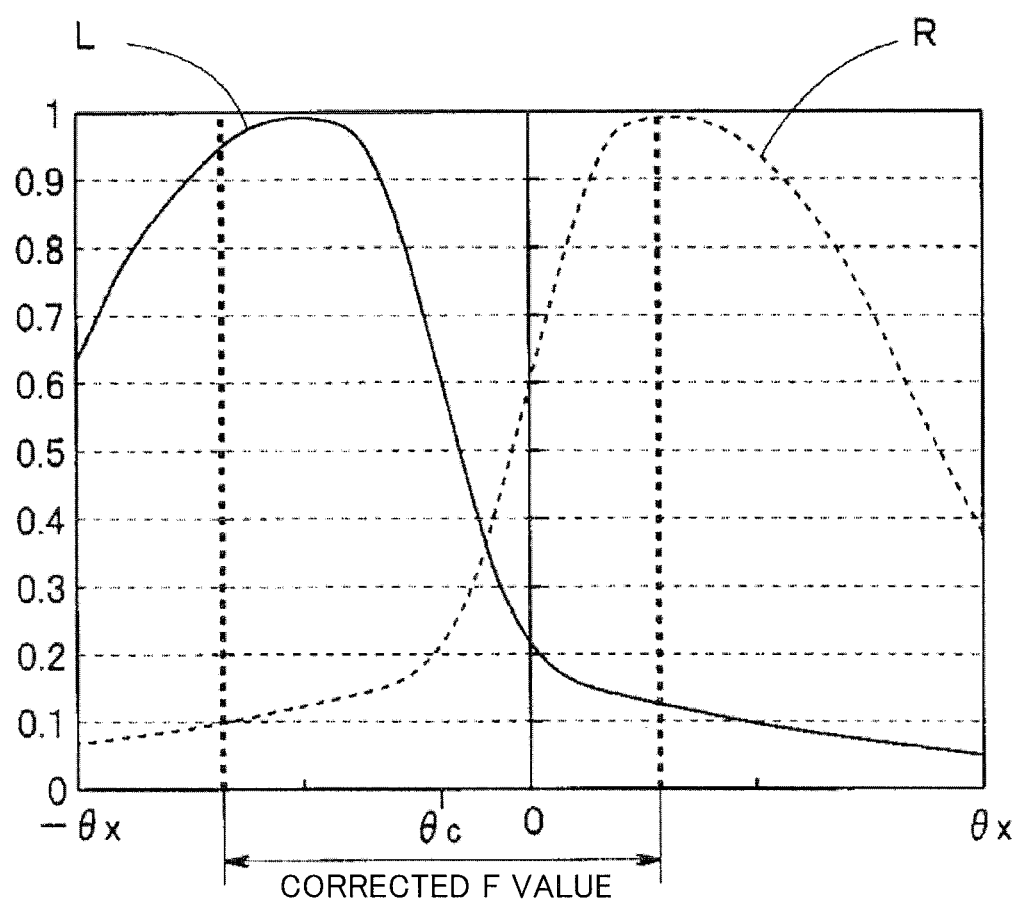
FIG. 5 is a drawing for explaining a relationship between imaging light flux angle range and AF sensitivity, for focus detection pixels that are off the optical axis, with the one embodiment of the present invention.

FIG. 4 and FIG. 5 are explanatory drawings for describing a relationship between angular range of imaging light flux IL and AF sensitivity. FIG. 4 shows a relationship for focus detection pixels that are on the optical axis, while FIG. 5 shows the relationship for focus detection pixels that are off the optical axis, and those light receiving sensitivity characteristics for L pixels and R pixels are a non-symmetrical characteristic.

As shown in FIG. 4, imaging light flux IL in an angular range shown by the thick dashed lines, for example, is incident on the focus detection pixels that are on the optical axis. This imaging light flux IL is left right symmetrical with respect to the optical axis, as shown in FIG. 4, and an angle difference between maximum incident angle and minimum incident angle corresponds to F value.

Also, maximum incident angle and minimum incident angle of imaging light flux IL for off-axis focus detection pixels is shifted in accordance with image height X shown in FIG. 3, resulting in an angular range shown by the thick dashed lines in FIG. 5, for example. An angle difference between maximum incident angle and minimum incident angle of the imaging light flux IL in this case actually corresponds to corrected F value, although this has been omitted from FIG. 3. This means that it is possible to acquire information on maximum incident angle and a minimum incident angle of the imaging light flux IL using the corrected F value and incident angle of a ray that passes through the center of the imaging light flux IL (hereafter referred to as imaging light flux incident angle).

With this embodiment, in order to make computation simple, a range of light flux that is incident on the focus detection pixels is obtained using information on the corrected F value and the imaging light flux incident angle (central direction of the imaging light flux IL), and AF sensitivity is obtained using this range. In this case, due to the effects of aberration of an optical system between the aperture and the light receiving surface S etc., incident angle of the imaging light flux IL that is incident on the imaging surface S at a specified image height differs for each optical system. With this embodiment, therefore, information on imaging light flux incident angle corresponding to image height of the light receiving surface S, that is acquired for the optical system, is used as an AF operation parameter.

Figure 6A:
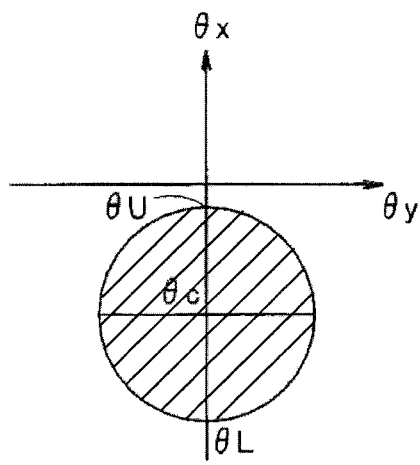
FIG. 6A and FIG. 6B are drawings for explaining effective aperture and imaging light flux incident angle θc, which is a central direction of imaging light flux, for incident light flux that is incident on focus detection pixels of image height X, with the one embodiment of the present invention.
Figure 6B:
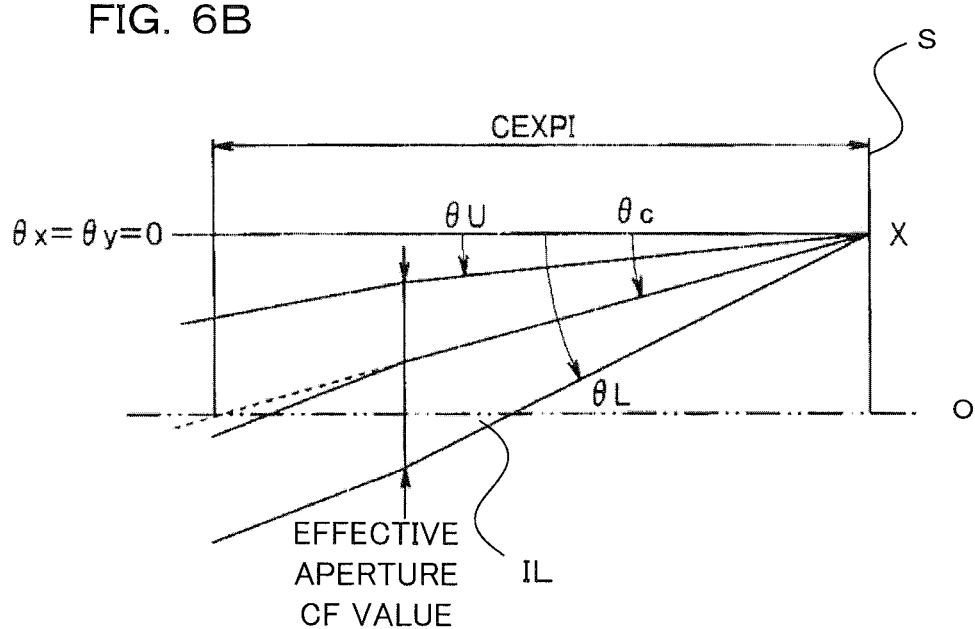

FIG. 6A and FIG. 6B are drawings for explaining effective aperture (corrected F value) and imaging light flux incident angle $\theta c$, which is a central direction of imaging light flux IL, for incident light flux that is incident on focus detection pixels of image height X. FIG. 6A shows angular range of a pupil seen from image height X. In the image height X direction the imaging light flux IL exists in a range from incident angle $\theta_L$ to $\theta_U$, and the center of the range is imaging light flux incident angle $\theta c$.

Further, ray incident angle to the light receiving surface S has a one-to-one correspondence to a position of an intersection point of a ray that passes through the center of the imaging light flux IL (the dashed line in FIG. 6B) and the optical axis O. A rate of change in this position is comparatively small compared to rate of change of the imaging ray incident angle $\theta c$. This enables high precision control with a comparatively small number of bits, by using information on this position instead of the information on the imaging light flux incident angle $\theta c$. With this embodiment, this position, namely a position where a straight line passing through the center of the imaging light flux IL crosses the optical axis O, will be referred to later as corrected exit pupil position (CEXPI). It should be noted that this position is different from exit pupil position that is defined as a paraxial amount.

The corrected exit pupil position (CEXPI) can be expressed by the following equation (1), and corrected F value (CF value) can be expressed by the following equation (2).

$$\text{Tan } \theta c = (\text{Tan } \theta U + \text{Tan } \theta L)/2$$

$$CEXPI = x/\text{Tan } \theta c \quad (1)$$

$$CF \text{ Value} = \text{Tan } \theta L - \text{Tan } \theta U \quad (2)$$

Thus, with this embodiment, the corrected F value (CF value) and information on corrected exit pupil position (CEXPI) that has been corrected in accordance with image height are used as the AF operation parameters. These items of information have different values for each optical system, and so information from the optical system is utilized. Also, since, depending on the value of the imaging light flux incident angle θc, the corrected exit pupil position (CEXPI) may become infinity, a reciprocal value of the corrected exit pupil position (CEXPI) is preferably used as AF operation parameter.

With this embodiment, information on corrected F value (CF value) that has been corrected in accordance with image height and corrected exit pupil position (CEXPI) that has been corrected in accordance with image height are used as AF operation parameters at the camera lens side, and a light receiving sensitivity characteristic of the focus detection pixels is used as the AF operation parameter at the camera body side. The AF operation parameters at the lens side are values that are inherent to the lens side based on optical design, while the AF operation parameters at the body side are values inherent to the body side based on design of the image sensor. Accordingly, by respectively holding these AF operation parameters at the lens side and the body side, it is possible to use the lens side and body side AF operation parameters even in a case where the type of the lens side and the body side is changed, and high precision AF operation becomes possible.

Figure 7A:
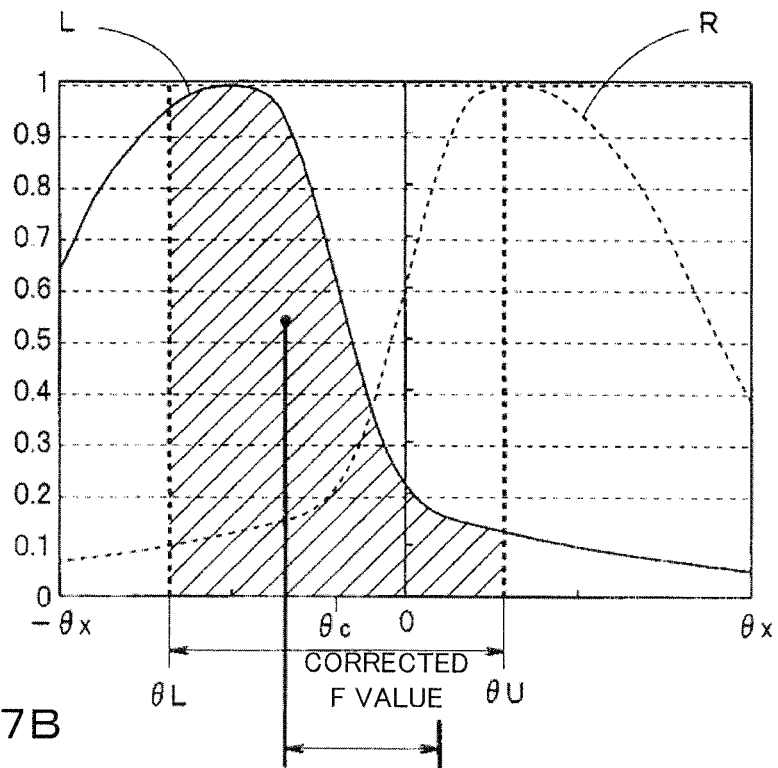
FIG. 7A and FIG. 7B are drawings for explaining a relationship between sensitivity and imaging light flux incident angle range of focus detection pixels of image height X that are not on the optical axis, and AF sensitivity, with the one embodiment of the present invention.
Figure 7B:
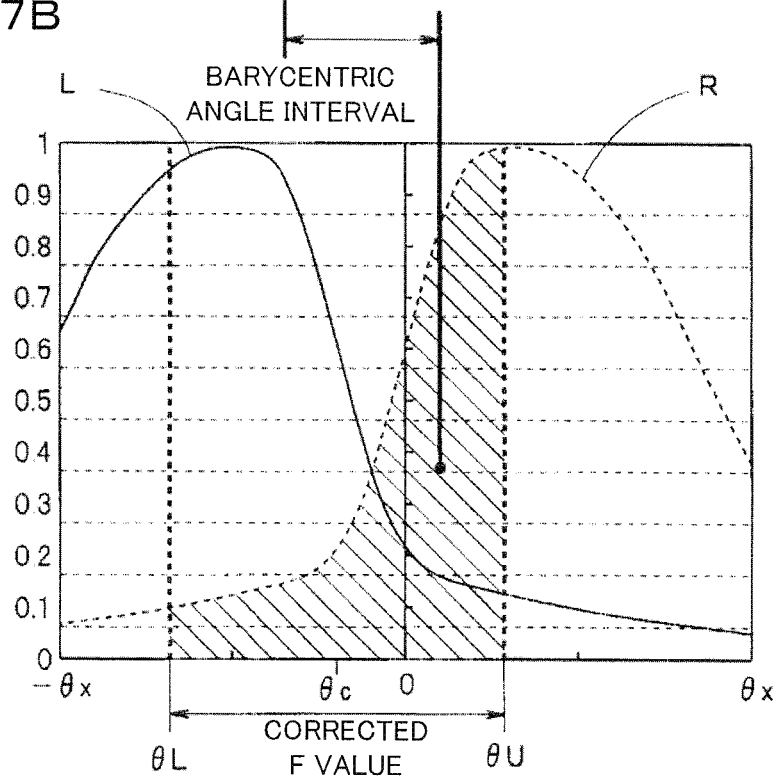

FIG. 7A and FIG. 7B are explanatory drawings for explaining a relationship between light receiving sensitivity and imaging light flux IL incident angle range, and AF sensitivity, of focus detection pixels of image height X that are not on the optical axis. A solid line L represents light receiving sensitivity of the L pixels, and a dashed line R represents light receiving sensitivity of the R pixels. Imaging light flux IL is incident on the focus detection pixels shown by the sensitivity characteristic of FIG. 7A and FIG. 7B in an angular range of the heavy dashed lines. Specifically, FIG. 7A and FIG. 7B show that the imaging light flux IL is incident only in an angular range corresponding to the corrected F value (CF value), with imaging light flux incident angle θc as a center.

Light receiving amount for the L pixels can be represented by the shaded area in FIG. 7A. Also, light receiving amount for the R pixels can be represented by the shaded area in FIG. 7B. It can be considered that a barycentric position of the shaded region in FIG. 7(a) corresponds to incident direction of the left light flux, while a barycentric position of the shaded region in FIG. 7(b) corresponds to incident direction of the right light flux. An angular interval between these barycentric positions (barycentric angular interval) can be considered to be proportional to AF sensitivity.

Specifically, barycentric angles GL and GR can be represented by equations (3) and (4) below, and AF sensitivity can be represented by the equation (5) below in which interval of barycentric angles has been multiplied by a given constant A. Here, light receiving sensitivity characteristics for the L pixels and R pixels are respectively made fL and fR. It should be noted that in actual fact, as shown by the shaded area in FIG. 6(a), since light flux has two dimensions of θx and θy, barycentric angle GL is represented by equation (6) (the same is true for barycentric angle GR and so this has been omitted).

$$GL = \frac{\int_{\theta L}^{\theta U} f_L(\theta x) \cdot \theta x \cdot d\theta x}{\int_{\theta L}^{\theta U} f_L(\theta x) \cdot d\theta x} \quad (3)$$

$$GR = \frac{\int_{\theta L}^{\theta U} f_R(\theta x) \cdot \theta x \cdot d\theta x}{\int_{\theta L}^{\theta U} f_R(\theta x) \cdot d\theta x} \quad (4)$$

$$AF \text{ sensitivity} = |GL - GR| \times A \quad (5)$$

(A is a constant)

$$GL = \frac{\int\int_{\theta L}^{\theta U} f_L(\theta x, \theta y) \cdot \theta x \cdot \theta y \cdot d\theta x \cdot d\theta y}{\int\int_{\theta L}^{\theta U} f_L(\theta x, \theta y) \cdot d\theta x \cdot d\theta y} \quad (6)$$

FIG. 7A and FIG. 7B show light receiving sensitivity characteristics for focus detection pixels of a given image height, but the light receiving sensitivity characteristic of the focus detection pixels changes in accordance with image height. Accordingly, at the body side information on the light receiving sensitivity characteristic for focus detection pixels of each image height are stored, and utilized.

Also, areas of the shaded regions of FIG. 7A and FIG. 7B correspond to light receiving amounts for L and R pixels respectively. If there is a difference in received light amount of L and R pixels for the same subject, then an L image based on the L pixels and an R image based on the R pixels will be different, making detection of a two-image interval difficult. Detection of the two-image interval is therefore made easy by subjecting L and R image signals to luminance correction (shading correction) in accordance with surface area of the shaded regions of FIG. 7A and FIG. 7B.

Surface area SL of the shaded portion of FIG. 7A and surface area of the shaded portion of FIG. 7B can be represented by equations (7) and (8) below, and a luminance correction coefficient can be represented by equation (9) below, for example. Luminance correction is carried out by multiplying output of the L pixels by this luminance correction coefficient. It should be noted that in actual fact, as shown by the shaded area of FIG. 6A, since light flux has two dimensions of θx and θy, surface area SL is represented by the equation (10) (the same applies to the surface area SR, and so this is omitted).

$$SL = \int_{\theta L}^{\theta U} f_L(\theta x) \cdot d\theta x \quad (7)$$

$$SR = \int_{\theta L}^{\theta U} f_R(\theta x) \cdot d\theta x \quad (8)$$

$$\text{Luminance correction coefficient} = SR/SL \quad (9)$$

$$SL = \iint f_L(\theta x, \theta y) \cdot d\theta x \cdot d\theta y \quad (10)$$

Figure 8A:
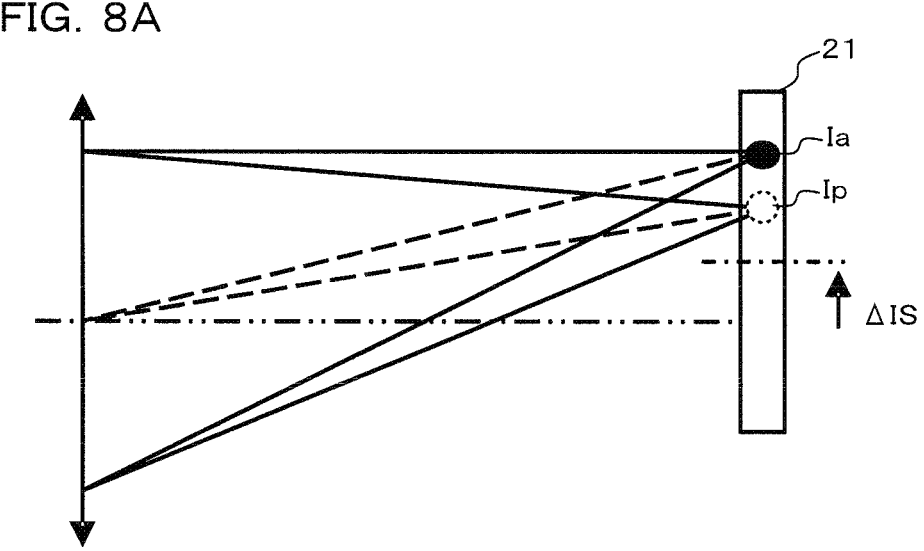
FIG. 8A and FIG. 8B are drawings for explaining the effect of image height in a case where an image sensor has been moved by a vibration section, with the one embodiment of the present invention.
Figure 8B:
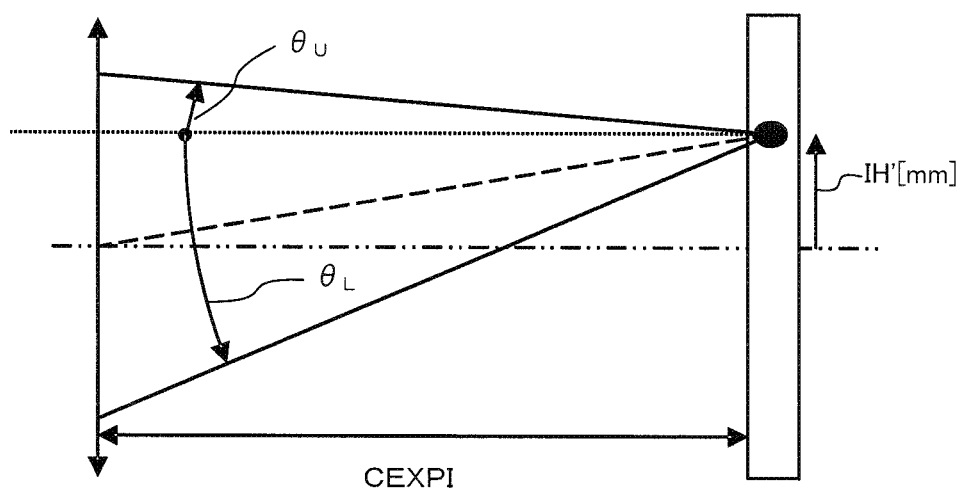

FIG. 8A and FIG. 8B are drawings for describing the effect on image height of an image sensor due to a vibration mechanism. At the time of actuation of a vibration mechanism, the effect of vibration looks the same as if image height has changed from an optical aspect. Image height is therefore calculated taking into consideration parts that move because of the vibration mechanism. FIG. 8A shows appearance where a vibration mechanism is activated and the image sensor 21 moves upwards by ΔIS. At this time, a ranging point moves from ranging point Ip before ΔIS movement to ranging point Ia, if viewed with position of the optical system as a reference.

Image height correction at the time of activation of a vibration mechanism involves obtaining movement amount ΔIS due to the vibration mechanism at the time of ranging, and from this obtaining ranging image height IH'[d] (image height of a ranging point) at the time of vibration mechanism drive using equation (11) below.

$$IH'=IH+\Delta IS \quad (11)$$

IH' that was obtained in equation (11) above obtains corrected FNo. (corrected F value (CF value) and CEXPI).

$$f1(FNo, zoom, LD, HD, IH) \rightarrow \text{corrected FNo(CF value)} \quad (12)$$

$$f2(FNo, zoom, LD, HD) \rightarrow *CEXPI \quad (13)$$

Here, f1 and f2 are functions of aperture value (FNo.), focal length (zoom), lens position (LD) and ranging image height (IH) of the photographing lens (shooting light flux). f1 and f2 also include interpolation calculations for data, such as discrete FNo., zoom, LD etc.

If corrected FNo. (CF value) and CEXPI have been obtained for ranging image height, tangent of an angle of light flux incident at the ranging image height is obtained (refer to FIG. 8B).

$$\text{Upper Ray tangent } U_P \text{ Up}=\tan \theta_U=1/(2*CF \text{ value})+ IH'/|CEXPI| \ldots \quad (14)$$

$$\text{Lower Ray tangent } L_O \text{ Lo}=\tan \theta_L=-1/(2*CF \text{ value})+ IH'/|CEXPI| \ldots \quad (15)$$

Also, in the image sensor there are relative position offsets between the silicon layers used in a photoelectric conversion function and microlenses for concentrating light onto pixels with good efficiency, due to the manufacturing processing. This offset arises with values that differ individually, and the effect of positional offset appears in the overall oblique-incidence characteristic of the image sensor being shifted sideways. With this embodiment positional offset of microlenses of the image sensor is corrected. Δθ is a tangent of angular offset of oblique-incidence characteristic that has been generated as a result of image sensor manufacturing errors etc. With this embodiment correction is carried out using values of a tangent of angular offset of oblique-incidence characteristic in values of tangents of an upper ray and a lower ray used at the time of AF sensitivity calculation.

$$\text{Upper Ray tangent } U_P \, U_P = U_P - \Delta\theta \quad (16)$$

$$\text{Lower Ray tangent } L_O \, L_O = L_O - \Delta\theta \quad (17)$$

With this embodiment, AF sensitivity is obtained by referencing the table of FIG. 9A and FIG. 9B using values of an upper ray $U_P$ and a lower ray $L_O$. In this embodiment, there are 13 individual ranging areas 0-12 of a first quadrant (ranging areas with no hatching), as shown in FIG. 9A. AF sensitivity is respectively obtained for every ranging area from the upper ray $U_P$ and the lower ray $L_O$, using a table such as shown in FIG. 9B. Also, second to fourth quadrants (ranging areas that are hatched in FIG. 9A) use a table having the same command numbers as the table that was used in the first quadrant.

Figure 10:
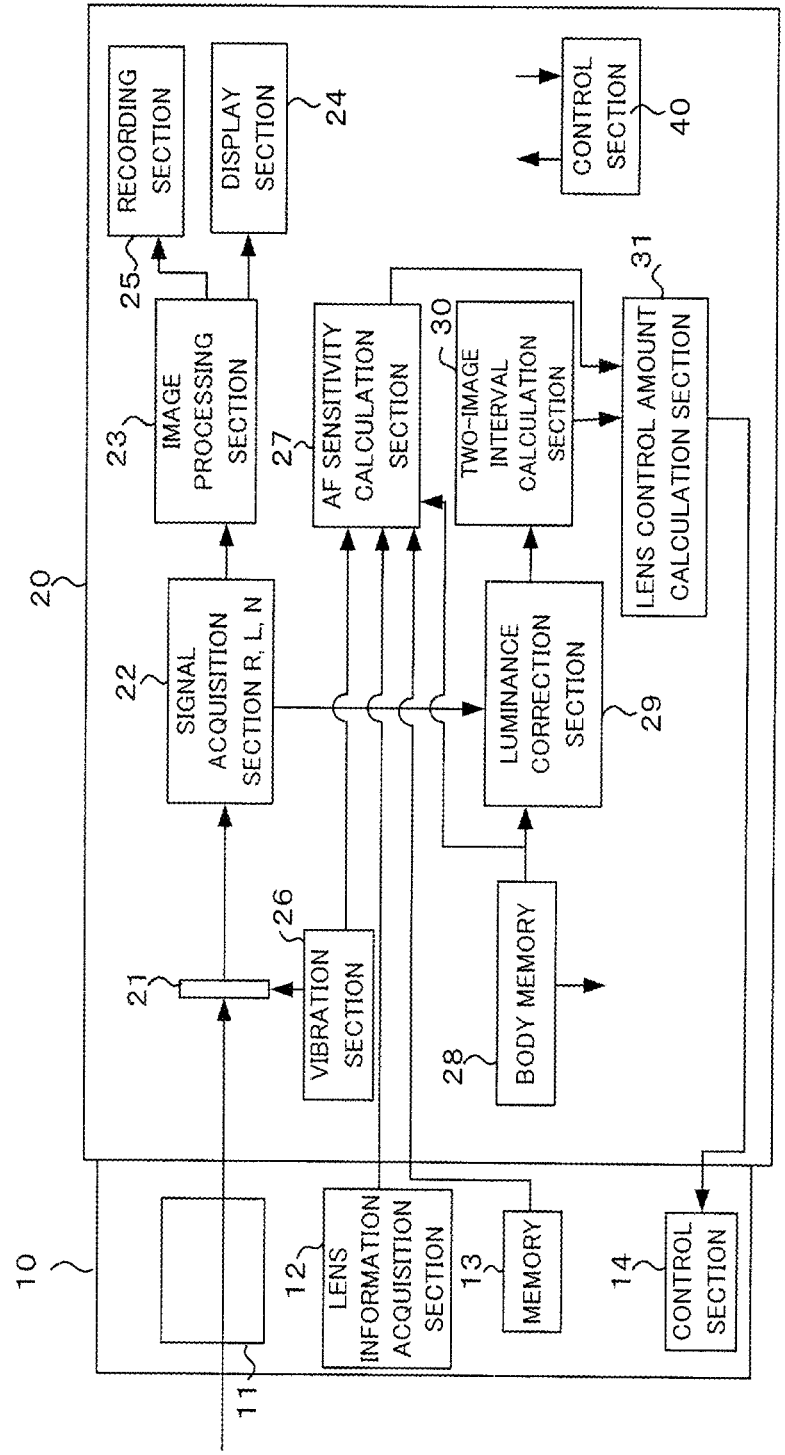
FIG. 10 is a block diagram mainly showing the electrical structure of a camera of one embodiment of the present invention.

Next, the structure of this embodiment will be described using FIG. 10. A camera of this embodiment comprises a body section 20 constituting main circuitry, and a lens section 10 capable of being mounted to a chassis of the body section 20. It should be noted that the lens section 10 may also be an interchangeable lens that can be attached to and detached from the body section 20.

An optical system 11, lens information acquisition section 12, memory 13 and control section 14 are provided in the lens section 10. The optical system 11 guides an optical image of a subject to an imaging surface of the image sensor 21 of the body section 20. The optical system 11 has an optical lens, not shown, and provides a focus drive function for focusing by performing drive control for the lens using the control section 14. The optical system 11 may also have a zoom function. A prime photographing lens may be adopted as the lens section 10.

The optical system 11 also has an aperture, not shown, and amount of subject light flux that passes within the photographing lens is controlled by controlling opening diameter of the aperture. If the opening diameter of the aperture is changed, incident angle of the subject light flux is also changed.

The lens information acquisition section 12 within the lens section 10 detects lens state information within the lens barrel 10, for example, zoom position (Zmenc) of the optical system, focus position (subject distance, IO) of the optical system, aperture value (FNo), and outputs this detected lens state information to the body section 20.

The memory 13 within the lens section 10 is an electrically rewritable non-volatile memory such as flash memory, and stores various information relating to the lens barrel 10 such as, for example, information relating to aperture position, aperture diameter, exit pupil position, exit pupil diameter, focus lens position, and vignetting according to image height and direction. The memory 13 also stores information on corrected F value (CF value) and corrected exit pupil position (CEXPI) according to lens state, as AF operation parameters. The memory 13 functions as a memory for storing information based on output of focus detection pixels. It is possible to calculate information on AF sensitivity in the body section 20 by transmitting the AF operation parameters in the memory 13 to the body section 20.

The control section 14 controls each section within the lens section 10 in accordance with control commands of a control section 40 within the camera body 20, in accordance with programs stored within the memory 13. The control section 14 carries out communication with the camera body 20, focus lens control within the optical system 11, aperture control etc. Using communication with the camera body 20, transmission of lens information that has been acquired by the lens information acquisition section 12, and transmission of various information stored within the memory 13 is carried out.

The body section 20 has an image sensor 21, signal extraction section 22, image processing section 23, display section 24, recording section 25, vibration section 26, AF sensitivity computation section 27, body memory 28, luminance correction section 29, two-image interval computation section 30, lens calculation control section 31 and control section 40.

The image sensor 21 is an image sensor such as a CMOS image sensor or CCD image sensor, and is arranged in the vicinity of an imaging position for a subject image formed by the optical system 11. The image sensor 21 is made up of the previously described imaging pixels, and L pixels and R pixels that are focus detection pixels. The image sensor 21 subjects a subject image to photoelectric conversion, and outputs a photoelectric conversion signal to the signal extraction section 22.

The signal extraction section 22 extracts and outputs an image signal from output of the image sensor 21. This image signal contains not only an image signal based on output of imaging pixels N, but also an L image signal based on output of the L pixels and an R image signal based on output of the R pixels. The signal extraction section 22 outputs the captured image signal to the image processing section 23, as well has outputting the L image signal and the R image signal that are based on outputs of the focus detection pixels (L pixels and R pixels) to the luminance correction section 29.

The image processing section 23 carries out given image processing, for example, color signal generation processing and matrix conversion processing, and various other signal processing, on the image signal from the signal extraction section 22. The image processing section 23 outputs an image signal after processing to the display section 24, and a taken image is displayed. The image processing section 23 also applies encoding processing to the image signal after processing and outputs compressed image information to the recording section 25, and this image information is recorded.

A card interface, for example, may be adopted as the recording section 25, and the recording section 25 is capable of recording image information and audio information etc. to a memory card or the like. The recording section 25 can also read out image information and audio information that has been recorded on a recording medium, and supply the read out information to the image processing section 23. The image processing section 23 can acquire an image signal and an audio signal by decoding image information and audio information from the recording section 25.

Movement such as handshake that has been applied to the camera body 20 is detected by a sensor such as a gyro, and the vibration section 26 drives the image sensor 21 within a plane that is perpendicular to the optical axis of the optical system 11 so as to counteract this movement (this operation is called a vibration operation). Also, at the time of the vibration operation, information relating to movement amount of the image sensor 21 (ΔIS in FIG. 8) is output to the AF sensitivity computation section 27.

As has been described above, the AF sensitivity computation section 27 is used when obtaining AF sensitivity in order to calculate defocus amount. Specifically, if AF sensitivity is made α and two-image interval is made A, then defocus amount Def can be represented by Def=α×A. The AF sensitivity computation section 27 is input with movement amount of the image sensor 21 ΔIS from the vibration section 26, lens information from the lens information acquisition section 12 within the lens section 10, and lens information (corrected F value (CF value) and corrected exit pupil position (CEXPI)) from the memory 13. Angular displacement information of an oblique-incidence characteristic at the time of manufacture of the image sensor 21 is also input to the AF sensitivity computation section 27 from the body memory 28.

The AF sensitivity computation section 27 calculates angle $\theta_U$, $\theta_L$ shown in FIG. 8B based on these items of information, and obtains AF sensitivity by referencing the table shown in FIG. 9A and FIG. 9B using this calculated angle $\theta_U$, $\theta_L$.

The body memory 28 is an electrically rewritable non-volatile memory such as flash memory, and stores the above described angular displacement information (Δθ) of an oblique-incidence characteristic at the time of manufacture of the image sensor 21. AF sensitivity for each Up, corresponding to angle of emission $\theta_U$ of an upper ray of light flux to a ranging position, and Lo, corresponding to angle of emission $\theta_L$ of a lower ray, as shown in FIG. 9B, are also stored in the body memory 28. Besides these items of information, various adjustment values within the camera body 20 and programs for control by the control section 40 etc. are also stored. It should be noted that each item of information output from the lens section 10 to the AF sensitivity computation section 27 is temporarily stored in the body memory 28 and may be output to the AF sensitivity computation section 27 as required.

The luminance correction section 29 is input with an L image signal and an R image signal from the signal extraction section 22, and angular displacement information for the oblique-incidence characteristic from the body memory 28, and carries out luminance correction for the L image signal and the R image signal using the angular displacement information. Imbalance between received light amounts of the L image signal and the R image signal, such as is shown in FIG. 4 and FIG. 5, caused by positional offset between micro-lenses of the image sensor 21 and the focus detection pixels, is corrected by this luminance correction.

Using a known calculation method, the two-image interval computation section 30 obtains a two-image interval from the L image signal and the R image signal that have been subjected to luminance correction, and outputs the two-image interval to the lens calculation control section 31.

The lens control amount calculation section 31 calculates a defocus amount using the two-image interval from the two-image interval computation section 30 and information on the AF sensitivity from the AF sensitivity computation section 27. Since the information on AF sensitivity is dependent on image height, the lens control amount calculation section 31 can calculate defocus amount with high precision even in a case where two-image interval is obtained using off-axis focus detection pixels. This calculated defocus amount is output to the control section 14 within the lens section 10, and the control section 14 carries out automatic focus adjustment control by controlling the optical system 11 based on this defocus amount.

The control section 40 controls each section of the body section 20. For example, the control section 40 detects user operation of various switches provided in the chassis of the body section 20, such as, for example a shooting mode setting switch, and a release button for carrying out shooting, and controls each section based on user operation.

Figure 11:
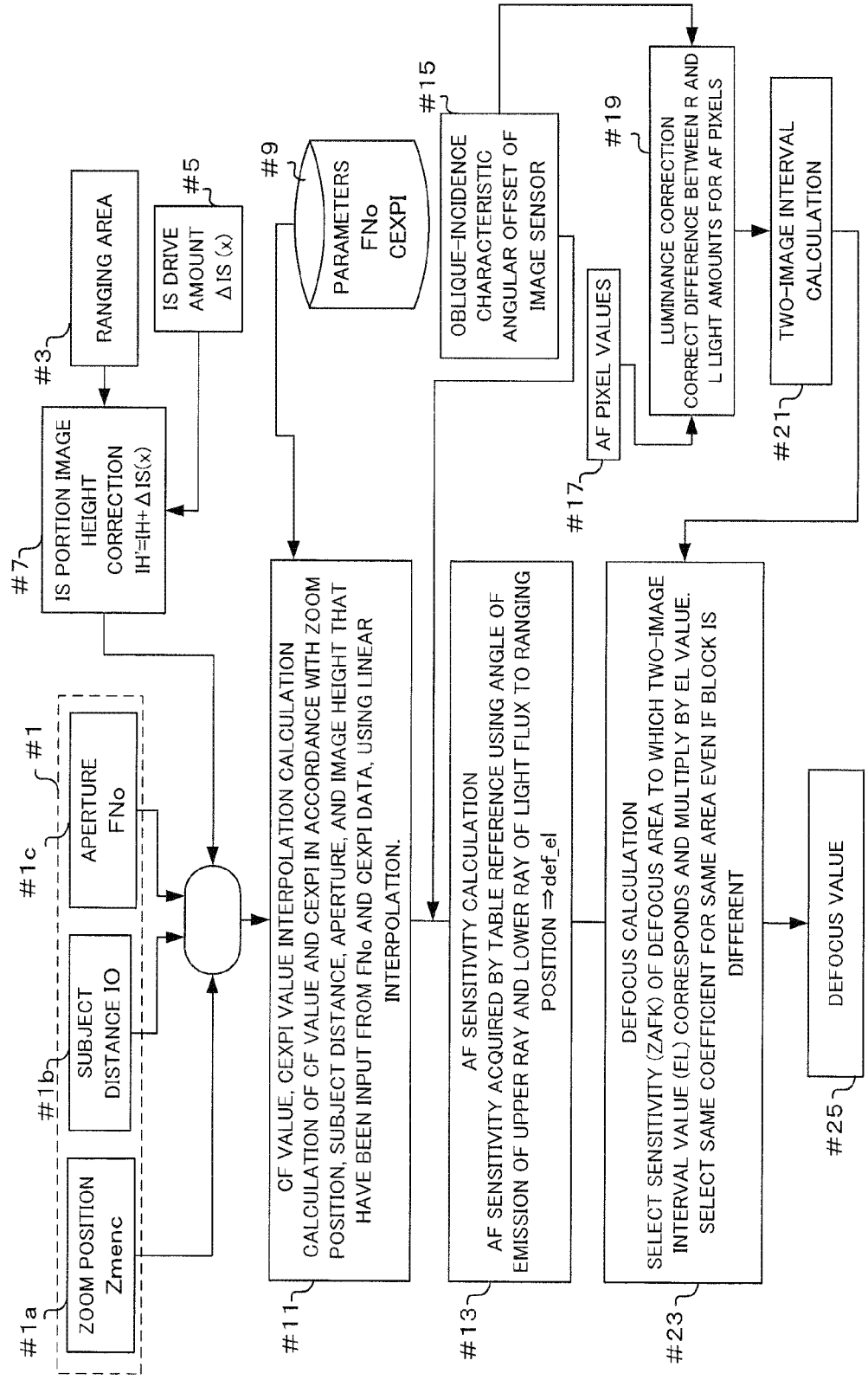
FIG. 11 shows flow of processing for calculating defocus amount for a camera of one embodiment of the present invention.

Next, processing flow for defocus amount calculation will be described using the processing flow diagram shown in FIG. 11. First, zoom position information (ZMENC) (#1*a*), subject distance information (IO)) (#1*b*), and aperture value information (FNo) (#1*c*) are acquired from the lens information acquisition section 12 within the lens section 10, and output to the AF sensitivity computation section 27 within the body section 20 (#1).

Also, the vibration section 26 within the body section 20 acquires IS drive amount ΔIS(x) (#5). Specifically, when the vibration section 26 carries out a vibration operation, information relating to movement amount of the image sensor 21 (ΔIS shown in FIG. 8A) is acquired. The control section 40 also acquires ranging area (#3). The ranging area is determined based on position of a face that has been detected by the image processing section 23, or a position that has been designated by the photographer using operation members, etc.

The control section 40 carries out IS portion image height correction using ranging area and IS drive amount ΔIS(x) (#7). Here, correction of image height is carried out in accordance with the above described equation (7), IH'=IH+ΔIS. Specifically, destination position on the optical system before movement is calculated from the fact that an area on the image sensor 21 corresponding to a determined ranging area moves as a result of a vibration operation, and this position is output to the AF sensitivity computation section 27.

A corrected F value (CF value) and exit pupil position (CEXPI) corresponding to lens state are stored in the memory 13 within the lens section 10 (#9), and this data is read out and output to the AF sensitivity computation section 27 of the body section 20.

The AF sensitivity computation section 27 is input with lens information from the lens section 10 that has been acquired by #1, an IS portion image height correction value that was calculated in #7, and data stored in the memory 13, and carries out interpolation calculation for FNo. and CEXPI value (#11). Here, CF value and CEXPI used in calculation are obtained using data for corrected F value (CF value) and corrected exit pupil position (CEXPI) that have been stored in the memory 13, based on zoom position, subject distance, and aperture that were acquired in #1, and image height that was calculated in #7. It should be noted that interpolation calculation is carried out because the data stored in the memory 13 is discrete. Angle of emission $\theta_U$ of an upper ray and angle of emission $\theta_L$ of a lower ray of light flux to a ranging position shown in FIG. 6B and FIG. 8B are then calculated based on equations (14) and (15) (tan $\theta_U$ and tan $\theta_L$ may also be calculated).

Since information on angular displacement of an oblique-incidence characteristic at the time of manufacture of the image sensor 21 (Δθ) is stored in the body memory 28 within the body section 20, the AF sensitivity computation section 27 calculates $\theta_U+\Delta\theta$, $\theta_L+\Delta\theta$ using this angular displacement information Δθ (#15).

If the AF sensitivity computation section 27 is input with angle of emission $\theta_U+\Delta\theta$ of an upper ray and angle of emission $\theta_L+\Delta\theta$ of a lower ray of light flux to a corrected ranging position, AF sensitivity (def_e1) is obtained by referencing a table stored in the body memory 28 using these angles (#13). This table reference will be described later using FIG. 14A to FIG. 18.

Pixel values (#17) of the R pixels and the L pixels from the signal extraction section 22, and angular displacement information of the oblique-incidence characteristic of the image sensor (#15) are output to the luminance correction section 29, and luminance correction is carried out (#19). Here, a difference in light amount between right openings and left openings of the focus detection pixels (AF pixels) is corrected using the angular displacement information.

Pixel values of the focus detection pixels that have been subjected to luminance correction are output to the two-image interval computation section 30, where two-image interval calculation is carried out (#21). Here, a two-image interval (EL) between R pixel rows and L pixel rows is calculated using known phase difference AF.

The lens control amount calculation section 31 is input with the AF sensitivity def_e1 that was calculated in #13 and the two-image interval (EL) that was calculated in #21, and carries out defocus calculation (#23). Here, an AF sensitivity (ZAFK) of a ranging area appropriate to the two-image interval value (EL) is selected, and defocus amount is obtained by multiplying this AF sensitivity by the EL value. It should be noted that the same coefficient is selected for the same area, even if a plurality of blocks into which the inside of the area has been divided are different. Once the defocus amount has been obtained by this calculation (#25), it is output to the control section 14 within the lens section 10, and the control section 14 carries out drive control of a focus lens within the optical system 11 to a focus position.

Thus, with this embodiment, a correction value for correcting information based on output of focus detection pixels in accordance with image height position is stored in the body memory 28, and information is corrected based on output of the body memory 28, output of the vibration section 26 (refer to #5), and output of focus detection pixels in accordance with position of the focus detection pixels (refer to AF sensitivity computation section 27, #11, #13 and #23). As a result, it is possible to correct information (AF sensitivity) in accordance with this image height even in a case where the image sensor 21 has moved within a vertical plane of the optical system 11 due to a vibration operation, for example, and it is possible to obtain an accurate defocus amount.

Also, with this embodiment, the memory 13 within the lens section 10 stores information relating to incident angle and angular range of light flux that is incident on the focus detection pixels, and the body memory 28 within the body section 20 stores information relating to characteristics of the focus detection pixels. As a result, when calculating information for focus adjustment (defocus amount), it is possible to obtain an accurate defocus amount since it is possible to subject respective information to respective processing even in a case where information at the lens section 10 side and information at the body section 20 is complex.

Next, overall control of the camera of this embodiment will be described using the flowchart shown in FIG. 12. This processing flow is executed by the control section 40 controlling the control section 14 within the lens section 10 and each section within the body section 20 in accordance with programs stored in the body memory 28.

If power supply to the camera is turned on, the control section 40 carries out lens communication (S1). Here, lens information is acquired from the lens information acquisition section 12, and lens information (corrected F value (CF value) and corrected exit pupil position (CEXPI)) is acquired from the memory 13. Lens communication is carried out periodically as well as in this step, or undertaken between the control section 40 and the control section 14 as required.

If lens communication has been carried out, next through image display is carried out (S3). A taken image (through image) is subjected to live view display on the display section 24 based on an image signal from the image sensor 21.

Once through image display has been carried out, it is next determined whether or not there is a first release (S5). Here, the control section 40 performs determination based on the state of a first release switch that is linked to a release button being pressed down half way. If the result of this determination is that a first release has not been performed, processing returns to step S1.

If the result of determination step S5 is that a first release has been performed, angle of emission of an upper ray and lower ray of light flux at a ranging position is calculated (S7). Here, the AF sensitivity computation section 27 obtains CF value and CEXPI using zoom position, subject distance, aperture, IS portion image height correction and data from the memory 13, and calculates upper ray angle of emission $\theta_U+\Delta\theta$ and lower ray angle of emission $\theta_L+\Delta\theta$ of light flux to the ranging position from these values (refer to #11 in FIG. 11).

If angle of emission has been calculated, next AF sensitivity is calculated (S9). Here, the AF sensitivity computation section 27 obtains AF sensitivity by referencing a table stored in the body memory 28 (for example, FIG. 9B) using the upper ray angle of emission $\theta_U+\Delta\theta$ and the lower ray angle of emission $\theta_L+\Delta\theta$ of the light flux to the corrected ranging position that was obtained in step S7 (refer to #13 in FIG. 11).

Once AF sensitivity has been calculated, next an AF image is read out (S11). Here, the signal extraction section 22 reads pixel values of focus detection pixels (R pixels and L pixels) from within pixel values that have been read out from the image sensor 21.

Once the AF image has been read, next luminance correction is carried out (S13). Here, luminance correction is carried out for focus detection pixel values that were read in step S11, using the angular displacement information for that was calculated in step S9 (#13 in FIG. 11) and oblique-incidence angular displacement information at the time of manufacture of the image sensor 21 stored in the body memory 28 (refer to #19 in FIG. 11).

If luminance correction has been carried out, next defocus amount calculation is carried out (S15). Here, the two-image interval computation section 30 calculates a two-image interval between the L pixel values and the R pixel values, using the focus detection pixel values that have been subjected to luminance correction. The lens control amount calculation section 31 calculates defocus amount using this calculated two-image interval and AF sensitivity that was calculated by the AF sensitivity computation section 27 (refer to #23 in FIG. 11).

Once defocus amount has been calculated, next focusing is carried out (S17). Here, the defocus amount that was calculated in step S15 is transmitted to the control section 14 within the lens section 10, and the control section 14 performs drive control based on the defocus amount so that a focus lens reaches a focus position.

Once focusing has been carried out, it is next determined whether or not there is a second release (S19). Here, the control section 40 performs determination based on the state of a second release switch that is linked to the release button being pressed down fully.

If the result of determination step S19 is that there is not a second release, then, similarly to step S5, it is determined whether or not there is a first release (S21). If there was a first release, the determinations of steps S19 and S21 are repeated. On the other hand, in the event that first release has not been performed, it is a state where a finger has been removed from the release button and the half pressing of the release button has been released, and processing returns to step S1.

If the result of determination in step S19 is second release, shooting is carried out (S23). At the time of shooting, a focus adjustment operation is completed using the AF sensitivity that has been corrected in accordance with image height, and a subject is focused on. Once shooting has commenced, the image sensor 21 is exposed for a shutter time, and once the shifted time has elapsed pixel values are read out from the image sensor 21 and pixel values of imaging pixels are extracted by the signal extraction section 22. The extracted pixel values are stored in the recording section 25 after having been subjected to image processing by the image processing section 23. Once shooting is completed, processing returns to step S1.

Next, search of AF sensitivity to be made the object from the table will be described using FIG. 13 to FIG. 15. As has been described above, AF sensitivity for each upper ray angle of emission $\theta_U$ and lower ray angle of emission $\theta_L$ of light flux to a ranging position are stored in the body memory 28, as shown in FIG. 9(b). Accordingly, with this embodiment, AF sensitivity is searched by table reference based on the calculated angles of emergence $\theta_U$ and $\theta_L$ (#13 in FIG. 11 and S9 in FIG. 12).

FIG. 13 shows an AF sensitivity table stored in the body memory 28. This example is a separate example from FIG. 9B. This table has $U_P = \tan\theta_U$ on a horizontal axis and $L_O = \tan\theta_L$ on a vertical axis, and stores AF sensitivity respectively corresponding to intersection points of these $U_P$ and $L_O$. Up_table[i] on the left side and Lo_table[j] at the upper side are used in a modified example of the AF sensitivity search that will be described using FIG. 14B, FIG. 16A, FIG. 16B and FIG. 17.

Figure 12:
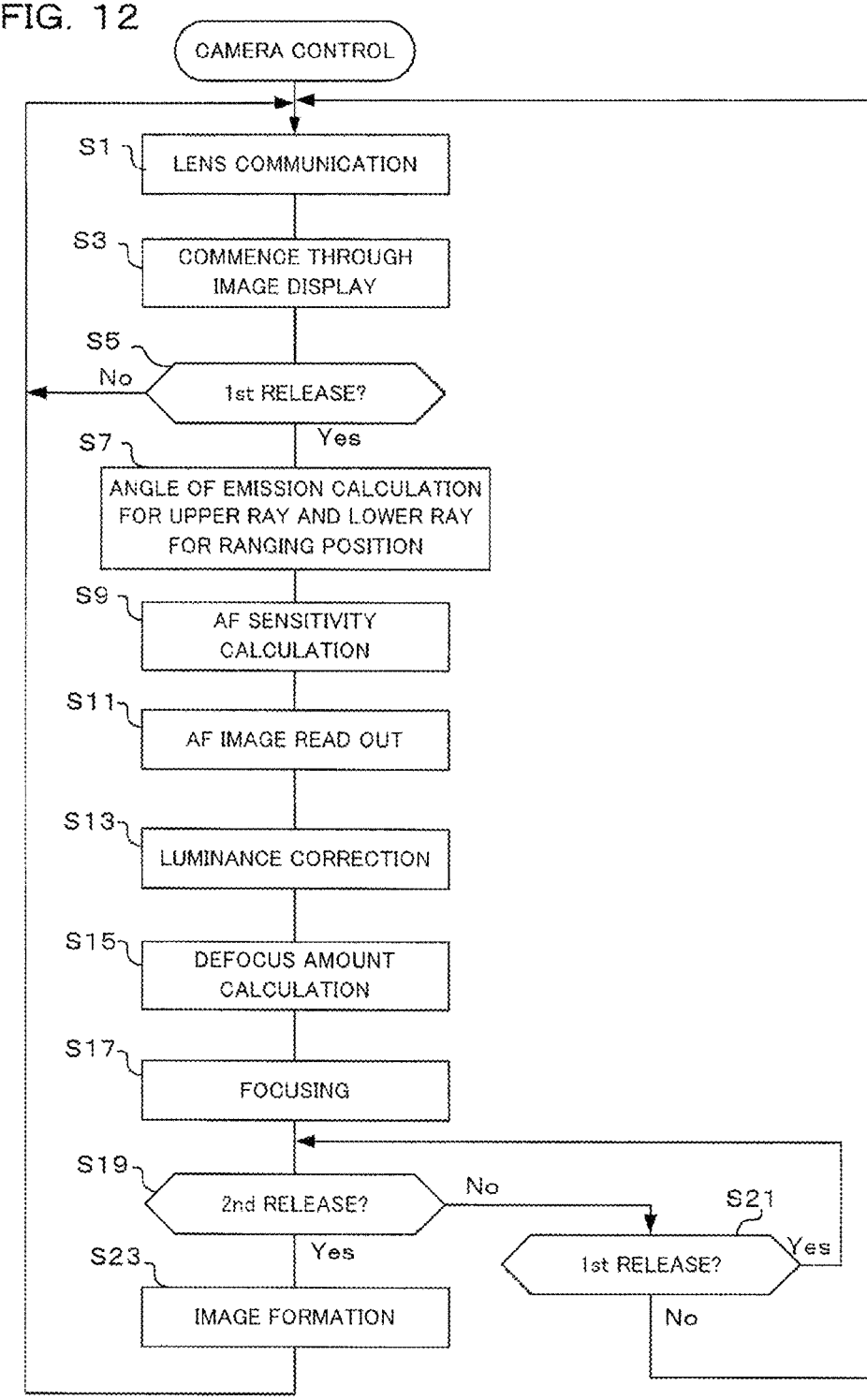
FIG. 12 is a flowchart showing operation of the camera of one embodiment of the present invention.
Figure 14A:
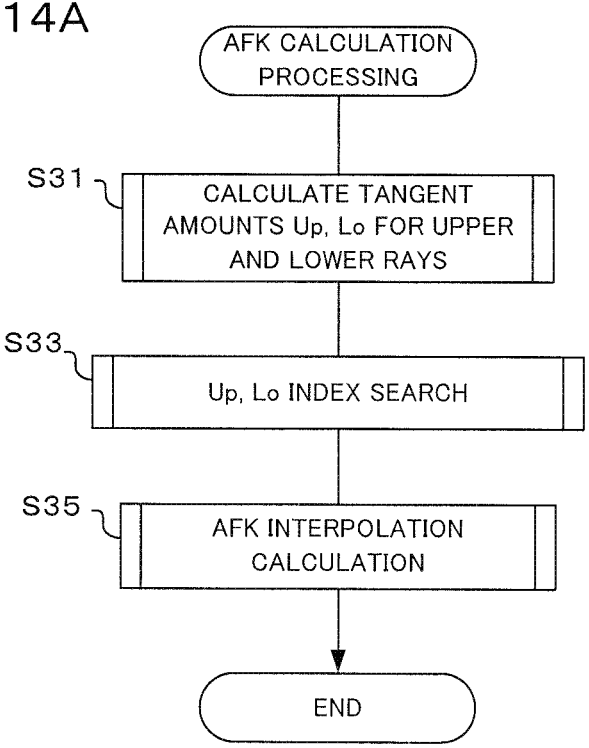
FIG. 14A and FIG. 14B are flowcharts showing operation of AFK calculation processing in the camera of one embodiment of the present invention.
Figure 14B:
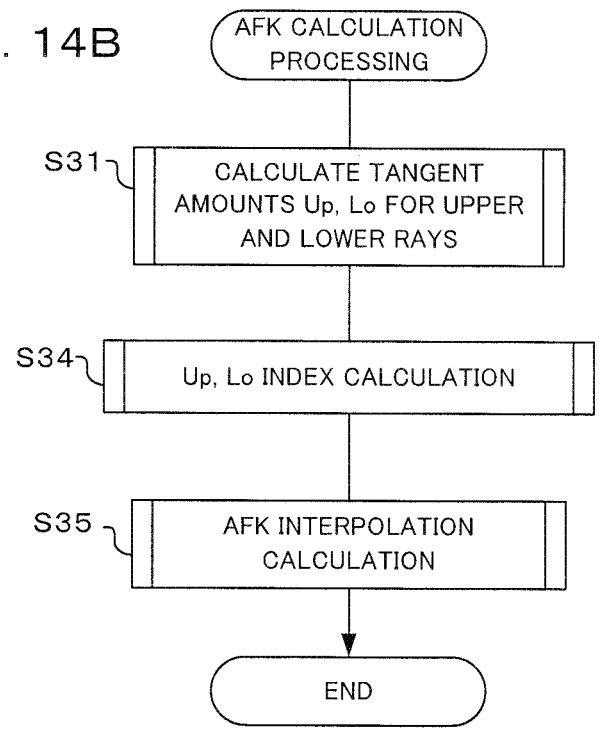

AFK calculation processing shown in FIG. 14A is a flowchart of processing for searching for AF sensitivity to be made an object from an AF sensitivity table executed during AF sensitivity calculation (S9) in FIG. 12. It should be noted that FIG. 14B is a flowchart relating to a modified example of FIG. 14A.

If the flow for AFK calculation processing is entered, first calculation of tangent amounts Up and Lo for upper and lower rays is carried out (S31). Here, as was described in #11 of FIG. 11, CF value and CEXPI are obtained, and tangent amounts for angle of emission $\theta_U$ of an upper ray and angle of emission $\theta_L$ of a lower ray of light flux, namely $\tan\theta_U$ and $\tan\theta_L$, are calculated based on equations (15) and (15).

Once tangent amounts Up and Lo for the upper and lower rays have been calculated, next a Up, Lo index search is carried out (S33). Here, AF sensitivity corresponding to Up and Lo that were calculated in step S31 is searched for. Detailed operation of this Up, Lo index search will be described later using FIG. 15.

Once the Up and Lo index search has been carried out, AFK interpolation calculation is carried out (S35). Since the table that was shown in FIG. 13 is only stored as discrete values, interpolation calculation is carried out in a case where Up and Lo are between these discrete values. Once interpolation calculation has been carried out, this AFK calculation processing is terminated.

Next, operation of the Up, Lo index search of step S33 will be described using FIG. 15. If the Up, Lo index search is entered, a Up obtained in step S31 (S41-S45) is looped by the number of divided Up groups. Here, an index i that satisfies Up<Up_table[i] is searched for while incrementing index i by 1 from 0 up to 127 in the vertical direction of the table of FIG. 13 (index i=0-127) (refer to S43).

If the result of determination in step S43 is that Up<Up_table[i] has become established, or an index i satisfying Up<Up_table[i] does not still exist even though in step S45 retrieval has been performed up to i=127, and further looped by the number of divided Up groups, i is set to i−1 (S47). It should be noted that subtracting 1 from i is for the purpose of adopting an index towards a start point within an index range that Up falls into.

If i has been set to i−1, next a Lo incremental loop is carried out for Lo that was calculated in step S31 (S49-S53). Here, an index j that satisfies Lo<Lo_table[j] is searched for while incrementing index j by 1 from 0 up to 127 in the horizontal axis direction of the table of FIG. 13 (index j=0-127) (refer to S53).

If the result of determination in step S51 is that Lo<Lo_table[j] has become established, or if in step S53 retrieval has been performed for j=127, and an index j satisfying Lo<Lo_table[j] does not exist as a result of the Lo incremental loop, j is set to j−1 (S55). It should be noted that subtracting 1 from j is for the purpose of adopting an index towards a start point within an index range that Lo falls into.

If up to step S55 has been executed, the flow for Up, Lo index search is terminated, and processing advances to AFK interpolation calculation of step S35 of the originating flow.

Next a modified example of the AFK calculation processing will be described using FIG. 14B, FIG. 16A, FIG. 16B and FIG. 17. With the AFK calculation processing of one embodiment of the present invention, AF sensitivity to be made an object is searched for while comparing one by one with values from the table shown in FIG. 13. As a result, as the table becomes larger, the longer time the search takes. With this modified example, therefore, values of the vertical axis and horizontal axis of the table are made equidistant, and search time is shortened by calculating in advance where the calculated Up and Lo are positioned in the table.

FIG. 16A is Up_table[i], with Up values being equidistant (with the illustrated example an interval of 0.1), the uppermost index i being made 0, and indices assigned sequentially from the top. With this example, an Up value when index i=4 is 0.0. Also, similarly, FIG. 16B is Lo_table[j], with Lo values being equidistant (with the illustrated example an interval of 0.1), the uppermost index j being made 0, and indices assigned sequentially from the top. With this example, an Lo value when index j=2 is 0.0.

Flow for the AFK calculation processing of this modified example is shown in FIG. 14B. This flowchart shown in FIG. 14B has step S33 of FIG. 14A replaced with step S34, and other steps are the same, and so description will center on step S34.

If tangent amounts Up and Lo for the upper and lower rays have been calculated in step S31, next Up and Lo indices are calculated (S34). Here, since the values of Up and Lo have been made equidistant, an Up value is divided by the equidistant value, and an index is calculated by adding Up and Lo indices for which Up and Lo values become 0. As a result, corresponding AF sensitivity can be searched in the table easily. Detailed operation of this Up and Lo index calculation will be described using FIG. 17. If an index has been calculated in step S34, AFK interpolation calculation is carried out, and once this interpolation calculation has been executed the flow for AFK calculation processing is terminated.

Figure 17:
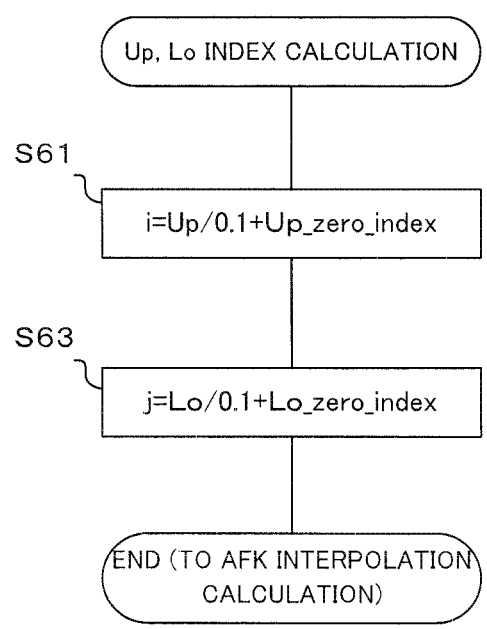
FIG. 17 is a flowchart showing operation of Up, Lo index calculation for the camera of one embodiment of the present invention.

Next, the Up and Lo index calculation of step S34 will be described using FIG. 17. If this flow is entered, first, index i is calculated from i=Up/0.1+Up_zero_index (S61). With this equation, 0.1, is the vertical axis of the table, namely the value of equidistant interval for Up. Also, Up_zero_index is an index at which Up value becomes 0.

Once index i has been obtained in step S61, next index j is calculated from j=Lo/0.1+Lo_zero_index (S63). With this equation, 0.1, is the horizontal axis of the table, namely the value of equidistant interval for Lo. Also, Lo_zero_index is an index at which Lo value becomes 0. If index j has been calculated in step S63, the originating flow is returned to.

Figure 15:
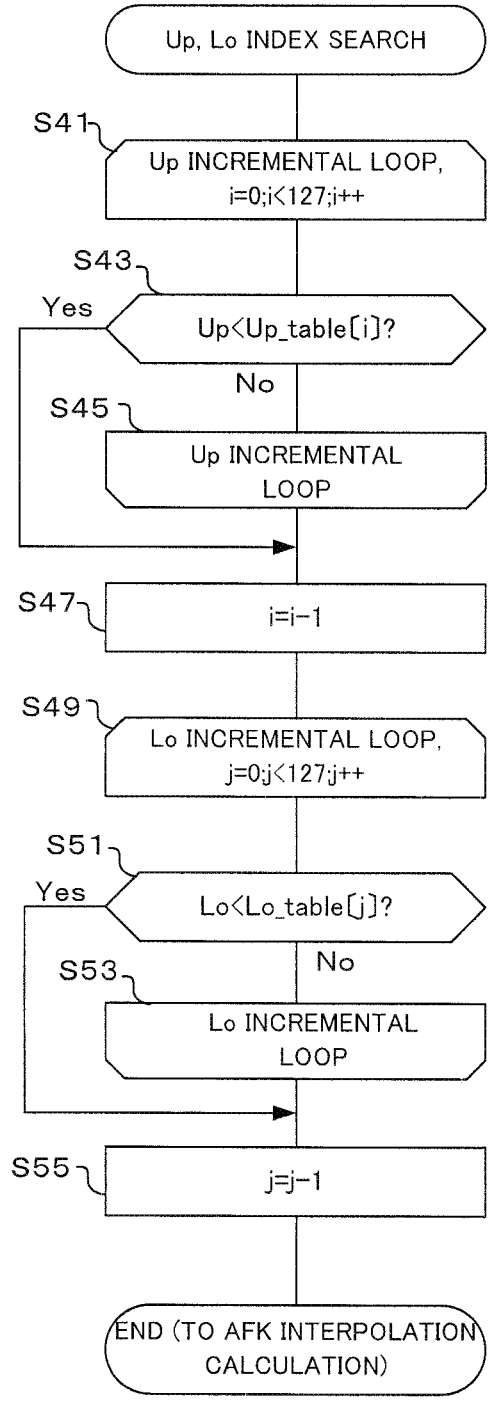
FIG. 15 is a flowchart showing operation of Up, Lo index search for the camera of one embodiment of the present invention.

In this way, with this modified example, since Up and Lo indices are calculated directly, compared to the case where Up and Lo indices are searched for, such as in FIG. 15, it is possible to shorten the time taken for table reference.

Figure 18:
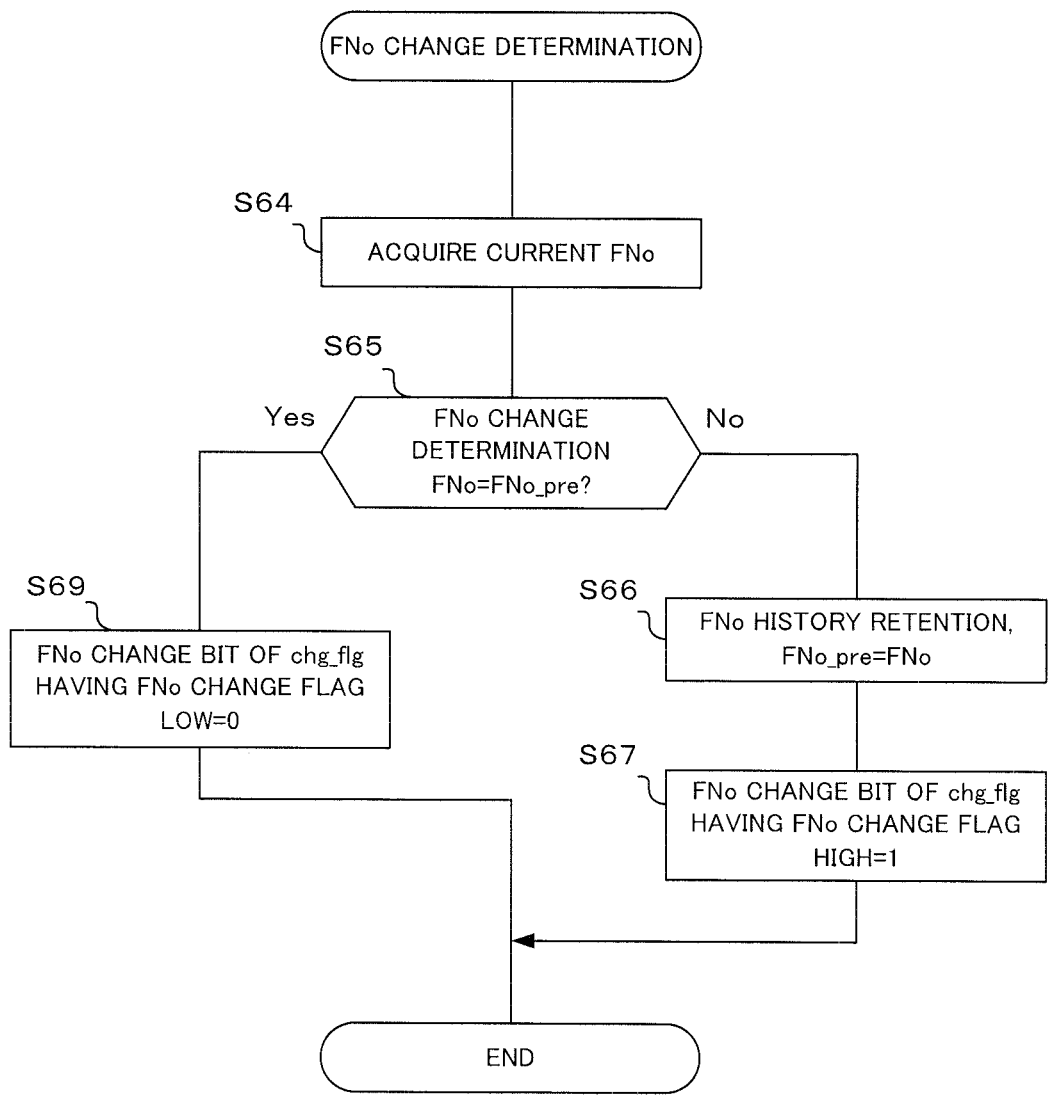
FIG. 18 is a flowchart showing operation FNo. change determination of the camera of a modified example of one embodiment of the present invention.
Figure 19:
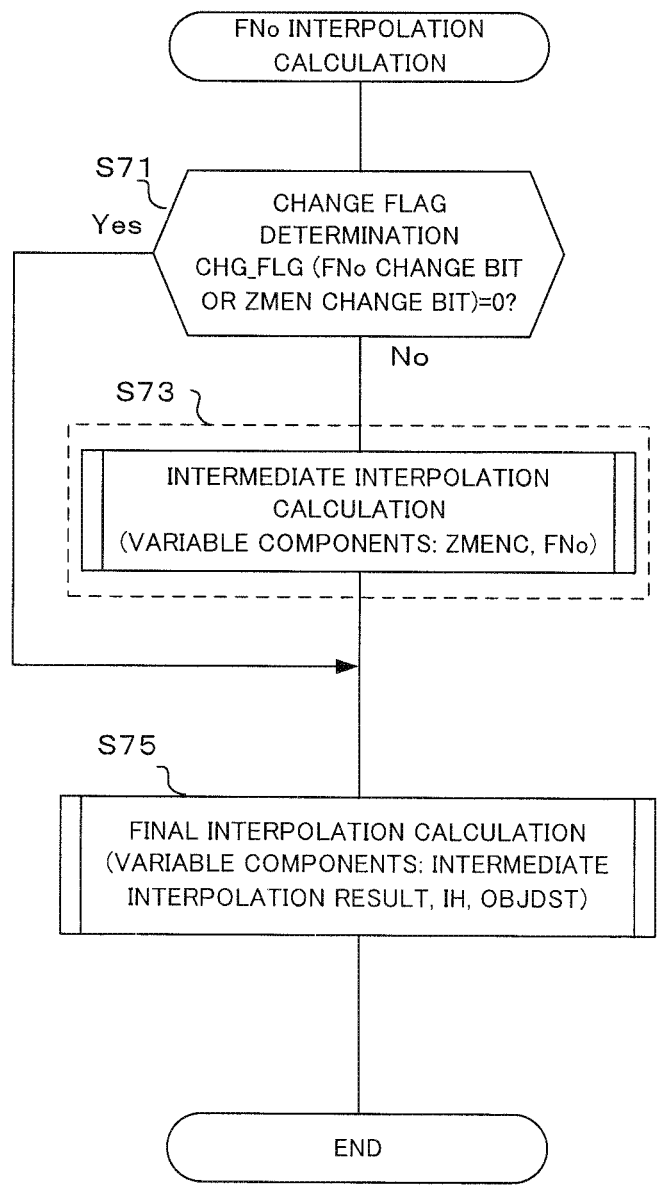
FIG. 19 is a flowchart showing operation FNo. interpolation calculation of the camera of a modified example of one embodiment of the present invention.

Next, making the interpolation computational processing relating to aperture value F No. high speed will be described using FIG. 18 and FIG. 19. With one embodiment of the present invention, interpolation calculation for FNo that was acquired from #9 in FIG. 11 is carried out using aperture value that was acquired in #1c of FIG. 11. The flow shown in FIG. 18 and FIG. 19 is for making this interpolation calculation high speed.

If the flow for F No. change determination is entered, first current FNo. is acquired (S64). Here, the control section 40 acquires aperture value F No. for the aperture within the optical system 11 from the lens information acquisition section 12.

If current FNo. has been acquired, next FNo. change determination is carried out (S65). As will be described later, since the previous FNo. is stored as FNo_pre, it is determined whether or not FNo=FNo_pre.

If the result of determination in step S65 is that the current and previous FNo do not match, namely that FNo has changed, FNo history retention is carried out (S66). Here, the currently acquired FNo is stored as FNo_pre=FNo. Next, an FNo change flag is set (S67). Here, an FNo change bit of a flag chg_flag representing whether or not FNo has changed is set to 1.

On the other hand, if the result of determination in step S65 is that the current and previous FNo do match, namely that FNo has not changed, the FNo change flag is reset to 0 (S69). Here, the FNo change bit of the flag chg_flag for representing that FNo has not changed is reset to 1.

If the setting or resetting of the FNo change flag has been carried out in step S67 or step S69, the flow for FNo change determination is terminated. If the flow for FNo change determination has been carried out, the FNo interpolation calculation shown in FIG. 19 is carried out. Although not illustrated, similarly to the FNo change determination described above, the same determination is also carried out for Zmenc, and a Zmenc change bit of the chg_flg is set or reset.

If the flow for FNo interpolation calculation shown in FIG. 19 is entered, first change flight determination is carried out (S71). Here it is determined whether or not the FNo change bit of the flag chg_flg that was set or reset in step S67 or S69 is 0.

If the result of determination in step S71 is not that the change flag chg_flg (FNo change bit or Zmen change bit)=0, specifically if aperture value FNo or Zmenc have changed, intermediate interpolation calculation is carried out (S73). On the other hand if there is no change, intermediate interpolation calculation is not carried out. As variable components of this intermediate interpolation calculation, as well as aperture value FNo, there is focal length Zmenc. In the event that there is no change, it is possible to shorten the time taken by calculation by reusing the previous results of interpolation calculation.

If the intermediate interpolation calculation has been carried out in step S73, or if the result of determination in step S71 was chg_flg (FNo change bit)=0, final interpolation calculation is carried out (S75). Here, as variable components, there are the intermediate interpolation result of step S73, IH (IS portion image height correction value), and OBJdst (subject distance). As was described in #11, FNo interpolation calculation is obtained based on these values.

In this way, with this modified example, for values that are likely to change over time, such as aperture value etc., it is detected whether or not there has been change, and in the case of no change intermediate interpolation calculation is omitted. As a result, in the event that there is no change it is possible to shorten the time taken for calculation.

As has been described above, with the one embodiment and the modified example of the present invention, an image sensor 21, having imaging pixels and focus detection pixels, which subjects light flux that is passed through a photographing lens (optical system 11) to photoelectric conversion and outputs an image signal, a vibration section 26 which corrects handshake by moving the image sensor 21 in a direction that is perpendicular to the optical axis of the photographing lens (optical system 11), and outputs information relating to the movement, memories (memory 13 and body memory 28) which store correction values for correcting information based on output of the focus detection pixels in accordance with image height position, and a correction section (for example, AF sensitivity computation section 27) which corrects information based on output of the memories, outputs of the vibration section and output of the focus detection pixels in accordance with position of the focus detection pixels, are provided. As a result, it is possible to carry out focus adjustment that eliminates the effects of image height, even if the image sensor 21 moves, using the vibration section 26.

Also, with the one embodiment and the modified example of the present invention, a correction value is a correction value for correcting a conversion coefficient for converting position error amount that has been calculated based on output of the focus detection pixels to defocus amount. For example, the AF sensitivity computation section 27 corrects this conversion coefficient.

Also, with the one embodiment and modified example of the present invention, a correction value is a correction value for correcting nonuniformity of luminance distribution due to incident light to the focus detection pixels, for output of the focus detection pixels (refer to the memory 13 and body memory 28). For example, the memory 13 stores corrected F value (CF value) that has been corrected in accordance with image height, and information on corrected exit pupil position (CEXPI). Also, the body memory 28 stores angular displacement information ($\Delta\theta$) for oblique-incidence at the time of manufacture of the image sensor 21, and it is possible to correct nonuniformity in luminance distribution due to incident light to the focus detection pixels based on this angular displacement information.

Also, with the one embodiment and the modified example of the present invention, a first memory (for example, the memory 13) which stores information relating to incident angle and angular range of light flux that is incident on the focus detection pixels, a second memory (for example, the body memory 28) which stores information relating to characteristics of the focus detection pixels, and a calculation section (for example, the AF sensitivity computation section 27) which calculates information for focus adjustment based on output of the first memory, output of the second memory, and output of the vibration section 26, are provided. Information relating to the optical system is stored in the first memory, where his information relating to focus detection elements is stored in the second memory. This means that even in a case where a combination of the optical system and the focus detection elements is changed, it is possible to accurately obtain information for focus adjustment without the effects of image height.

Also, with the one embodiment and the modified example of the present invention, they are an interchangeable lens (lens section 10) including a photographing lens, and a camera body (body section 20), to which the interchangeable lens company attached or detached, having an image sensor, and the first memory (for example, the memory 13) is provided in the interchangeable lens, while the second memory (for example, the body memory 28) is provided in the camera body. As a result it is possible to accurately obtain information for focus adjustment without the effects of image height, even if a different interchangeable lens is attached.

Also, with the one embodiment and modified example of the present invention, the first memory (for example, the memory 13) stores information relating to incident angle and angular range in association with optical states of the interchangeable lens. For example, the table shown in FIG. 9(b) and FIG. 13 that is stored in the memory 13 stores information in association with values of an upper ray $U_P$ and a lower rate $L_O$. This makes it possible to eliminate the effects of image height that arise in accordance with change in optical state at the lens section 10 side.

Also, with the one embodiment and the modified example of the present invention, the second memory stores information relating to characteristics of the focus detection pixels in association with image height. For example, the body memory 28 stores angular displacement information for oblique-incidence at the time of manufacture of the image sensor 21 in accordance with image height. This makes it possible to eliminate the effects of image height attributable to the image sensor 21 at the body section 20 side.

It should be noted that with the one embodiment and modified example of the present invention, although an upper ray and lower ray of light flux that is incident to the ranging position have been represented by tangent amounts Up and Lo in accordance with angle, angle may also be detected directly, or may be obtained from a table.

In calculating AF sensitivity, aperture value FNo and CEXPI were obtained by interpolation calculation based on zoom position, subject distance, aperture, and IS portion image height correction value, UP and Lo were obtained from these values, oblique-incidence characteristic angular displacement information for the image sensor was input, and from this input AF sensitivity was obtained by table reference. However, the order of procedural steps may be varied as appropriate. The AF sensitivity computation section 27 may also perform two dimensional integration of a region corresponding to a shaded area, which is a range of light flux incident angle on a light receiving sensitivity characteristic of focus detection pixels, as shown in FIG. 7A and FIG. 7B, in the X and Y directions, obtaining a barycentric angle for the two integration results, and calculating AF sensitivity from an interval between barycentric angles relating to pairs of L and R focus detection pixels. It is also possible to correct coordinate information for a ranging point (FIG. 9A) that has been selected from within a plurality of ranging points with displacement amount of the image sensor 21 by the vibration section 26, and calculate AF sensitivity based on the corrected coordinate information. It is also possible to perform angular conversion of a characteristic change portion, such as light receiving sensitivity for focus detection pixels of the image sensor 21, and to calculate AF sensitivity by performing calculation with an angle of emission range changed.

Further, with this embodiment, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC), tablet type computer, game console etc. In any event, it is possible to adopt the present invention as long as a device carries out focus adjustment using a pupil-division image plane phase contrast method.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they may be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to the above described embodiments, and structural elements may be modified in actual implementation within the scope of the gist of the embodiments. It is also possible to form various inventions by suitably combining the plurality of structural elements disclosed in the above described embodiments. For example, it is possible to omit some of the structural elements shown in the embodiments. It is also possible to suitably combine structural elements from different embodiments.

What is claimed is:

1. A focus adjustment device, comprising:
   an image sensor having imaging pixels and focus detection pixels, which subjects light flux that is passed through a photographing lens to photoelectric conversion and outputs an image signal,
   a first memory which stores information relating to angle of emission range of light flux that is emitted towards the image sensor, in accordance with image height,
   a second memory which stores information relating to characteristics of the image sensor, and
   a vibration section which corrects hand shake by causing movement of the image sensor in a direction perpendicular to the optical axis of the photographing lens, and outputs information relating to the movement of the image sensor, and
   a calculation section which calculates information for focus adjustment based on output of the first memory, output of the second memory and output of the vibration section, wherein
   the calculation section calculates information relating to corrected angle of emission range based on information related to the angle of emission range and information relating to the movement of the image sensor, and calculates information for focus adjustment based on the information relating to the corrected angle of emission range and information relating to characteristics of the image sensor.

2. The focus adjustment device of claim 1, wherein the information relating to angle of emission range is incident angle and angular range of light flux.

3. The focus adjustment device of claim 1, wherein the first memory retains information relating to angle of emission range for every state of the photographing lens.

4. The focus adjustment device of claim 3, wherein the photographing lens has a zoom function, and a state of the photographing lens is information relating to zoom position.

5. The focus adjustment device of claim 3, wherein the photographing lens has a focus lens, and a state of the photographing lens is information relating to position of the focus lens.

6. The focus adjustment device of claim 3, wherein the photographing lens has an aperture, and a state of the photographing lens is information relating to opening of the aperture.

7. The focus adjustment device of claim 1, wherein the information relating to characteristics of the image sensor is an oblique-incidence characteristic of the focus detection pixels.

8. The focus adjustment device of claim 1, wherein the information relating to characteristics of the image sensor is a conversion coefficient for converting phase difference detection information to a defocus amount based on output of the focus detection pixels, with respect to incident angle range of light flux that is incident on the image sensor.

9. The focus adjustment device of claim 1, wherein the information relating to characteristics of the image sensor is information relating to individual differences of the oblique-incidence characteristic.

10. An imaging device, having a lens section which guides light flux that has passed through a photographing lens and a body section capable of being fitted to the lens section, comprising:
    an image sensor having imaging pixels and focus detection pixels, which subjects light flux that is passed through a photographing lens to photoelectric conversion and outputs an image signal,
    a first memory, provided in the lens section, which stores information relating to angle of emission range in accordance with image height of light flux that is emitted towards the image sensor,
    a second memory, provided in the body section, which stores information relating to characteristics of the image sensor, and
    the body section is provided with a vibration section which corrects hand shake by causing movement of the image sensor in a direction perpendicular to the optical axis of the photographing lens, and outputs information relating to the movement of the image sensor, and
    a calculation section which calculates information for focus adjustment based on output of the first memory, output of the second memory and output of the vibration section,
    wherein
    the calculation section calculates information relating to corrected angle of emission range based on information related to the angle of emission range and information relating to the movement of the image sensor, and calculates information for focus adjustment based on the information relating to the corrected angle of emission range and information on characteristics of the image sensor.

11. The imaging device of claim 10, wherein the information relating to angle of emission range is incident angle and angular range of light flux.

12. The imaging device of claim 10, wherein the first memory retains information relating to angle of emission range for every state of the photographing lens.

13. The imaging device of claim 12, wherein the photographing lens has a zoom function, and a state of the photographing lens is information relating to zoom position.

14. The imaging device of claim 12, wherein the photographing lens has a focus lens, and a state of the photographing lens is information relating to position of the focus lens.

15. The imaging device of claim 12, wherein the photographing lens has an aperture, and a state of the photographing lens is information relating to opening of the aperture.

16. The imaging device of claim 10, wherein the information relating to characteristics of the image sensor is an oblique-incidence characteristic of the focus detection pixels.

17. The imaging device of claim 10, wherein the information relating to characteristics of the image sensor is a conversion coefficient for converting phase difference detection information to a defocus amount based on output of the focus detection pixels, with respect to incident angle range of light flux that is incident on the image sensor.

18. The imaging device of claim 10, wherein the information relating to characteristics of the image sensor is information relating to individual differences of the oblique-incidence characteristic.

19. A focus adjustment method for an imaging device, having a lens section, which guides light flux that has passed through a photographing lens, a body section, comprising an image sensor having imaging pixels and focus detection pixels, which subjects light flux that has passed through the photographing lens, that is capable of being fitted to the lens section, to photoelectric conversion and outputs an image signal, and a vibration section which corrects hand shake by causing movement of the image sensor in a direction perpendicular to the optical axis of the photographing lens, and outputs information relating to the movement of the image sensor, comprising reading out information relating to angle of emission range in accordance with image height of light flux that is emitted towards the image sensor from the lens section, reading out information on characteristics of the image sensor from the body section, and calculating information relating to corrected angle of emission range based on information related to the angle of emission range and output of the vibration section, and calculates information for focus adjustment based on the information relating to the corrected angle of emission range and information on characteristics of the image sensor.

20. The focus adjustment method of claim 19, wherein the information relating to angle of emission range is incident angle and angular range of light flux.

* * * * *